US012633545B2

(12) United States Patent
Lee et al.

(10) Patent No.: US 12,633,545 B2
(45) Date of Patent: May 19, 2026

(54) ANODE, METHOD FOR MANUFACTURING SAME BY USING ELECTROLYTIC DEPOSITION, AND DEVICE FOR MANUFACTURING SAME

(71) Applicant: INDUSTRY-UNIVERSITY COOPERATION FOUNDATION HANYANG UNIVERSITY ERICA CAMPUS, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: INDUSTRY-UNIVERSITY COOPERATION FOUNDATION HANYANG UNIVERSITY ERICA CAMPUS, Ansan-Si (KR)

(*) Notice: Subject to any disclaimer, the term of this patent is extended or adjusted under 35 U.S.C. 154(b) by 816 days.

(21) Appl. No.: 17/659,371

(22) Filed: Apr. 15, 2022

(65) Prior Publication Data

US 2022/0293957 A1 Sep. 15, 2022

Related U.S. Application Data

(63) Continuation of application No. PCT/KR2020/014080, filed on Oct. 15, 2020.

(30) Foreign Application Priority Data

Oct. 15, 2019 (KR) ........................ 10-2019-0127836

(51) Int. Cl.
*H01M 4/66* (2006.01)
*C01B 25/37* (2006.01)
(Continued)

(52) U.S. Cl.
CPC ............. *H01M 4/66* (2013.01); *C01B 25/375* (2013.01); *H01M 4/0407* (2013.01);
(Continued)

(58) Field of Classification Search
None
See application file for complete search history.

(56) References Cited

U.S. PATENT DOCUMENTS 6,558,848 B1 5/2003 Kobayashi et al.
6,794,087 B2 9/2004 Choi
(Continued)

FOREIGN PATENT DOCUMENTS

CN 1143839 A 2/1997
CN 1329373 A 1/2002
(Continued)

OTHER PUBLICATIONS

Liu et al., "Unique 3D nanoporous/macroporous structure Cu current collector for dendrite-free lithium deposition", Energy Storage Materials, vol. 17, pp. 253-259 (Feb. 2019).
(Continued)

*Primary Examiner* — Maria Laios
(74) *Attorney, Agent, or Firm* — Finch & Maloney PLLC

(57) ABSTRACT

An anode is provided. The anode can comprise a three dimensional current collector and an anode active material layer provided on the surface of the three dimensional current collector.

9 Claims, 21 Drawing Sheets

(51) Int. Cl.

| | |
|---|---|
| ***H01M 4/02*** | (2006.01) |
| ***H01M 4/04*** | (2006.01) |
| ***H01M 4/134*** | (2010.01) |
| ***H01M 4/1395*** | (2010.01) |
| ***H01M 4/36*** | (2006.01) |
| ***H01M 10/0525*** | (2010.01) |
| ***H01M 10/0562*** | (2010.01) |

(52) U.S. Cl.

CPC ......... *H01M 4/134* (2013.01); *H01M 4/1395* (2013.01); *H01M 4/366* (2013.01); *H01M 10/0525* (2013.01); *H01M 10/0562* (2013.01); *C01P 2002/54* (2013.01); *C01P 2002/74* (2013.01); *H01M 2004/027* (2013.01)

(56) References Cited

U.S. PATENT DOCUMENTS

| | | | | |
|---|---|---|---|---|
| 9,735,418 | B2 | 8/2017 | Woo et al. | |
| 10,283,762 | B2 | 5/2019 | Hong et al. | |
| 10,333,135 | B2 | 6/2019 | Paulsen et al. | |
| 10,707,481 | B2 | 7/2020 | Lee et al. | |
| 10,734,642 | B2 | 8/2020 | Zhamu et al. | |
| 10,858,749 | B2 | 12/2020 | Park et al. | |
| 11,021,367 | B2 | 6/2021 | Kang et al. | |
| 11,316,145 | B2 | 4/2022 | Woo et al. | |
| 12,107,216 | B2 | 10/2024 | Lee et al. | |
| 2004/0042954 | A1 | 3/2004 | Park et al. | |
| 2009/0269677 | A1 | 10/2009 | Hirose et al. | |
| 2011/0070500 | A1* | 3/2011 | Chen .................... | H01M 10/052 429/231.95 |
| 2012/0043530 | A1* | 2/2012 | Badre ...................... | C08L 25/18 257/E51.026 |
| 2012/0315550 | A1 | 12/2012 | Liu et al. | |
| 2013/0149227 | A1 | 6/2013 | Chon et al. | |
| 2013/0164611 | A1 | 6/2013 | Nanba et al. | |
| 2014/0170303 | A1* | 6/2014 | Rayner ................. | H01M 4/463 216/75 |
| 2014/0349187 | A1* | 11/2014 | Hirose .................. | H01M 4/386 429/223 |
| 2014/0377653 | A1 | 12/2014 | Park et al. | |
| 2015/0037689 | A1 | 2/2015 | Nishimura et al. | |
| 2016/0301008 | A1 | 10/2016 | Mitchell et al. | |
| 2017/0117538 | A1 | 4/2017 | Bendimerad et al. | |
| 2017/0187066 | A1 | 6/2017 | Tsujimura et al. | |
| 2017/0204241 | A1 | 7/2017 | Nicolay et al. | |
| 2017/0244098 | A1 | 8/2017 | Duong et al. | |
| 2018/0034038 | A1 | 2/2018 | Rogren | |
| 2018/0190977 | A1* | 7/2018 | Park ....................... | H01M 4/362 |
| 2018/0241032 | A1 | 8/2018 | Pan et al. | |
| 2018/0358654 | A1 | 12/2018 | Forsyth et al. | |
| 2019/0027781 | A1 | 1/2019 | Lee et al. | |
| 2019/0088986 | A1 | 3/2019 | Hu et al. | |
| 2019/0379088 | A1 | 12/2019 | Schmidt et al. | |
| 2020/0235427 | A1 | 7/2020 | Kim et al. | |
| 2022/0158171 | A1 | 5/2022 | Ryu et al. | |

FOREIGN PATENT DOCUMENTS

| | | | |
|---|---|---|---|
| CN | 101567462 | A | 10/2009 |
| CN | 103887477 | A | 6/2014 |
| CN | 105762342 | A | 7/2016 |
| CN | 107180967 | A | 9/2017 |
| CN | 107834044 | A | 3/2018 |
| CN | 108028371 | A | 5/2018 |
| CN | 109192965 | A | 1/2019 |
| EP | 3783679 | A1 | 2/2021 |
| JP | 08-021388 | B | 3/1996 |
| JP | 09-265976 | A | 10/1997 |
| JP | 2005-251466 | A2 | 9/2005 |
| JP | 2010-111597 | A2 | 5/2010 |
| JP | 2016-189321 | A | 11/2016 |
| JP | 2018-516435 | A | 6/2018 |
| KR | 10-2003-0030818 | A | 4/2003 |
| KR | 10-2006-0025515 | A | 3/2006 |
| KR | 10-2012-0022629 | A | 3/2012 |
| KR | 10-2012-0113685 | A | 10/2012 |
| KR | 10-2013-0114097 | A | 10/2013 |
| KR | 10-2014-0031953 | A | 3/2014 |
| KR | 10-2014-0046611 | A | 4/2014 |
| KR | 10-2014-0144590 | A | 12/2014 |
| KR | 10-2014-0148384 | A | 12/2014 |
| KR | 10-1573423 | B1 | 12/2015 |
| KR | 10-2016-0062617 | A | 6/2016 |
| KR | 10-2016-0091981 | A | 8/2016 |
| KR | 10-1681739 | B1 | 12/2016 |
| KR | 10-2017-0077014 | A | 7/2017 |
| KR | 10-2017-0081196 | A | 7/2017 |
| KR | 10-1788232 | B1 | 10/2017 |
| KR | 10-1808373 | B1 | 12/2017 |
| KR | 10-2018-0015841 | A | 2/2018 |
| KR | 10-2018-0102554 | A | 9/2018 |
| KR | 10-2018-0116137 | A | 10/2018 |
| KR | 10-2019-0003940 | A | 1/2019 |
| KR | 10-2019-0010250 | A | 1/2019 |
| KR | 10-2019-0042089 | A | 4/2019 |
| KR | 10-2019-0120725 | A | 10/2019 |
| WO | 2001/029912 | A1 | 4/2001 |
| WO | WO2015080302 | A1 | 6/2015 |
| WO | 2018025036 | A1 | 2/2018 |
| WO | WO2019031766 | A2 | 2/2019 |
| WO | WO2019188358 | A1 | 10/2019 |

OTHER PUBLICATIONS

International Search Report for International Application No. PCT/KR2020/014080 mailed Jan. 19, 2021, 4 pages.

Orita et al., "Application of sulfonium-, thiophenium-, and thioxonium-based salts as electric double-layer capacitor electrolytes", Journal of Power Sources, vol. 195, No. 19, pp. 6970-6976 (2010).

Taniki et al., "Effects of HF content in the (FH)n F-anion on the formation of ionic plastic crystal phases of N-ethyl-N-methylpyrrolidinium and N, N-dimethylpyrrolidinium fluorohydrogenate salts", Physical Chemistry Chemical Physics, vol. 16, No. 4, pp. 1522-1528 (2014).

U.S. Appl. No. 17/659,369 (English translation of originally-filed application papers), application filed Apr. 15, 2022 (78 pages).

U.S. Appl. No. 17/659,370 (English translation of originally-filed application papers), application filed Apr. 15, 2022 (99 pages).

U.S. Appl. No. 17/659,374 (English translation of originally-filed application papers), application filed Apr. 15, 2022 (110 pages).

Written Opinion of the International Searching Authority for International Application No. PCT/KR2020/014080 mailed Jan. 19, 2021, 4 pages.

Mei et al., "Triple carbon coated LiFePO4 composite with hierarchical conductive architecture as high-performance cathode for Li-ion batteries", Electrochimica Acta 153, pp. 523-530 (2015).

U.S. Appl. No. 17/659,369, Notice of Allowance dated May 21, 2025 (9 pages).

Zhou et al., "Graphene modified LiFePO4 cathode materials for high power lithium ion batteries", J. Mater. Chem., 21, pp. 3353-3358 (2011).

Notice of Allowance, U.S. Appl. No. 17/659,370, dated Dec. 19, 2025 (8 pages).

Notice of Allowance, U.S. Appl. No. 17/659,374, dated Mar. 26, 2026 (8 pages).

* cited by examiner

【Fig. 1】
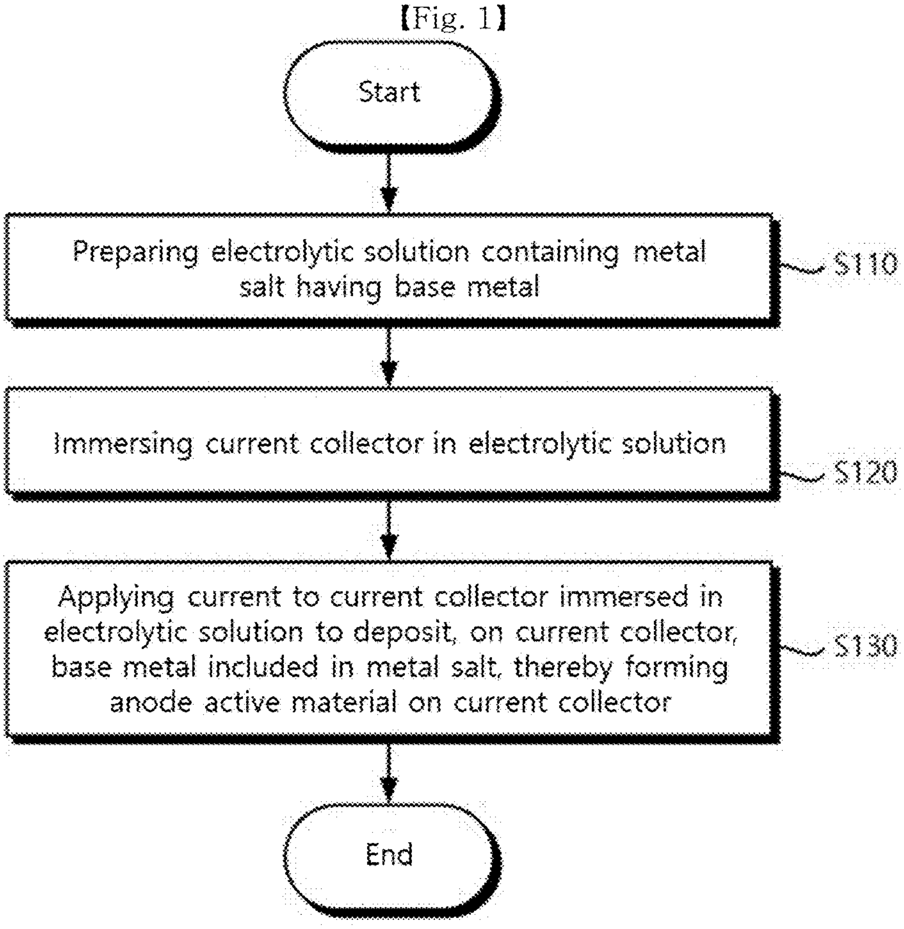
【Fig. 2】
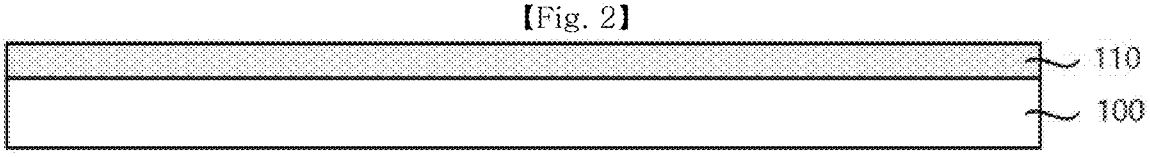

【Fig. 3】
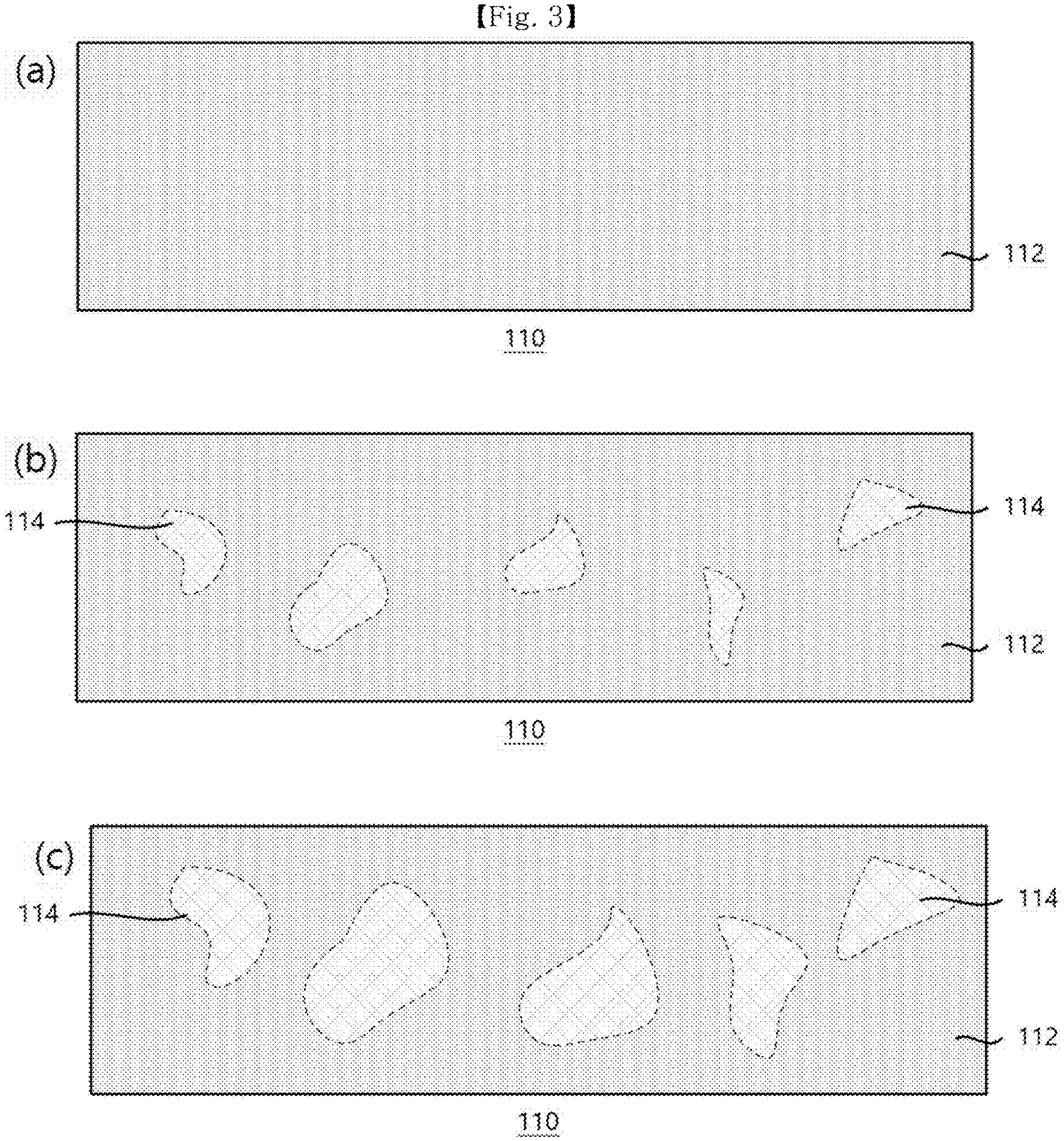

【Fig. 4】
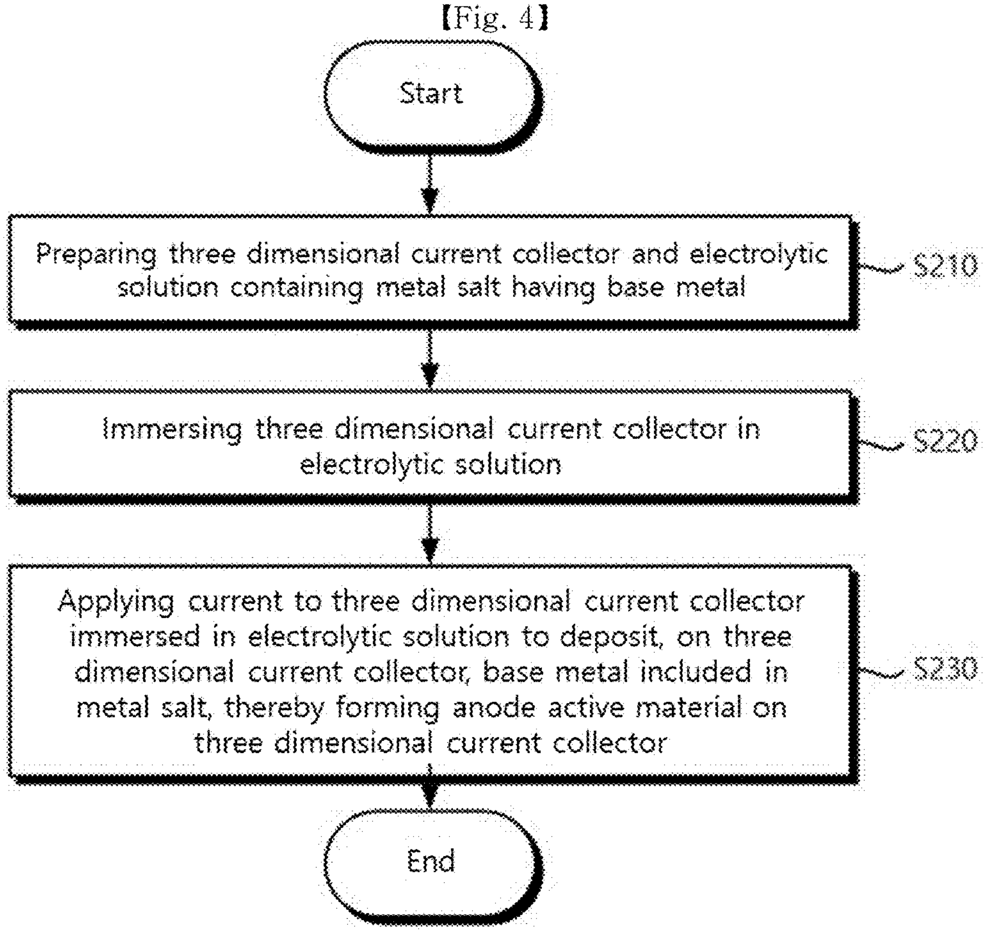
【Fig. 5】
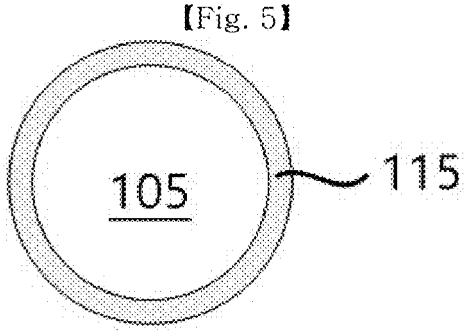
【Fig. 6】
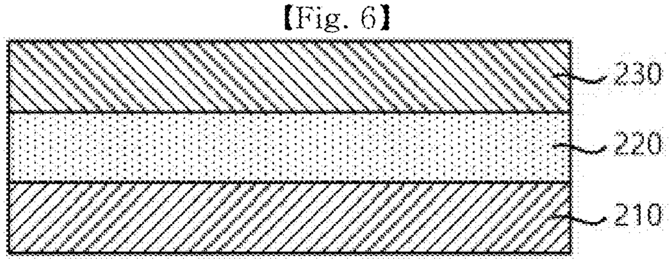

【Fig. 7】
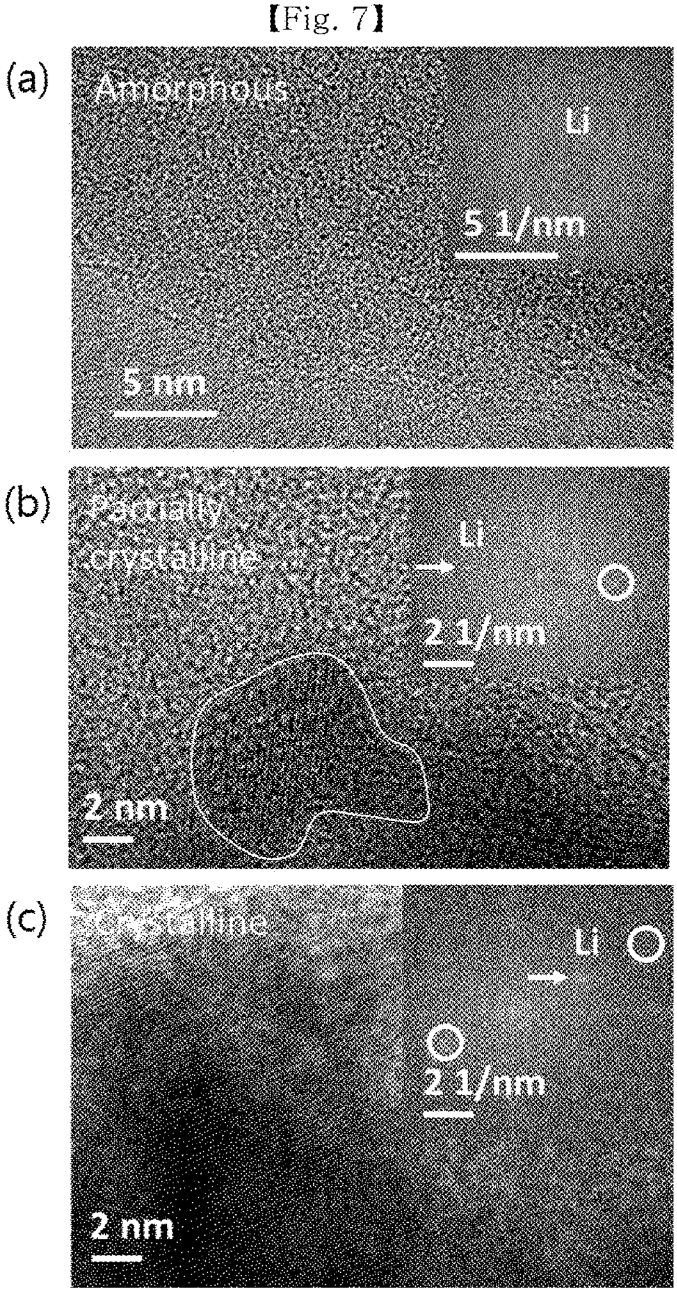

【Fig. 8】
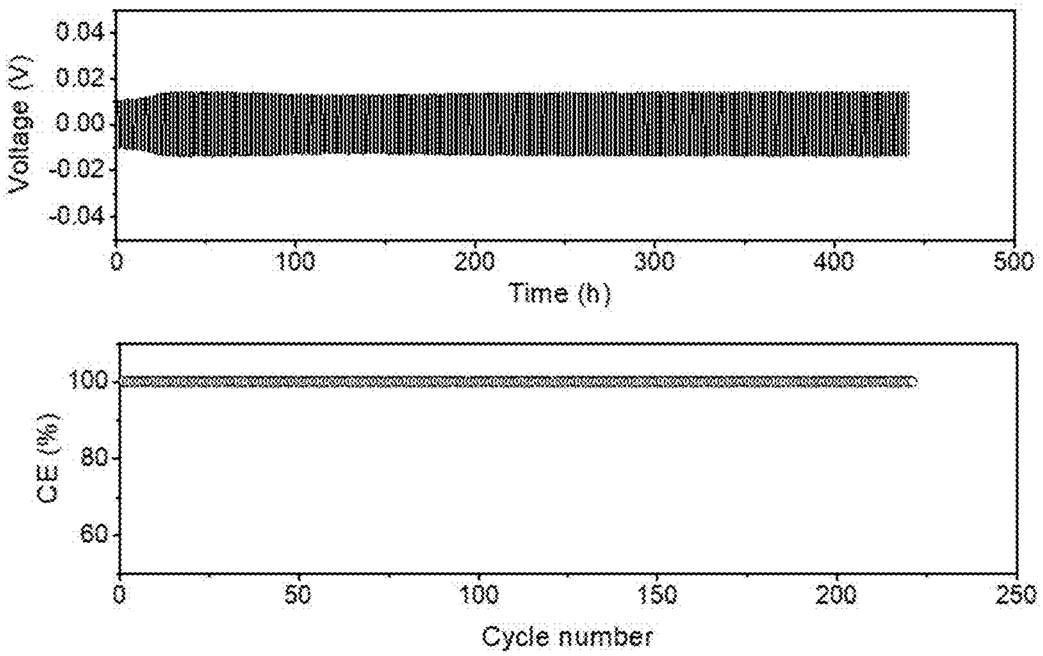
【Fig. 9】
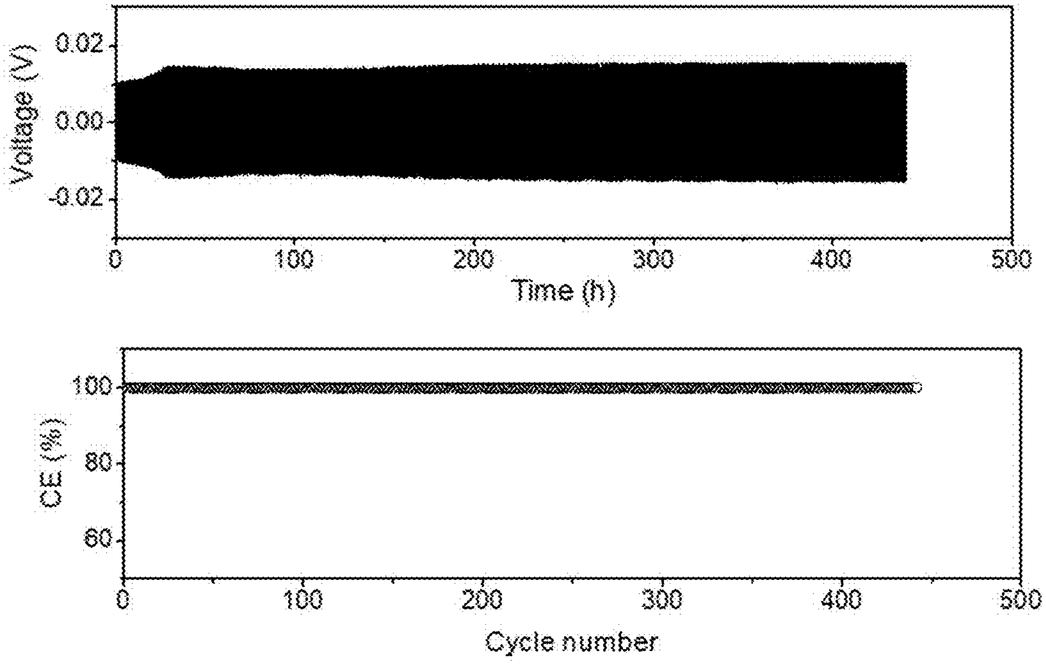

【Fig. 10】
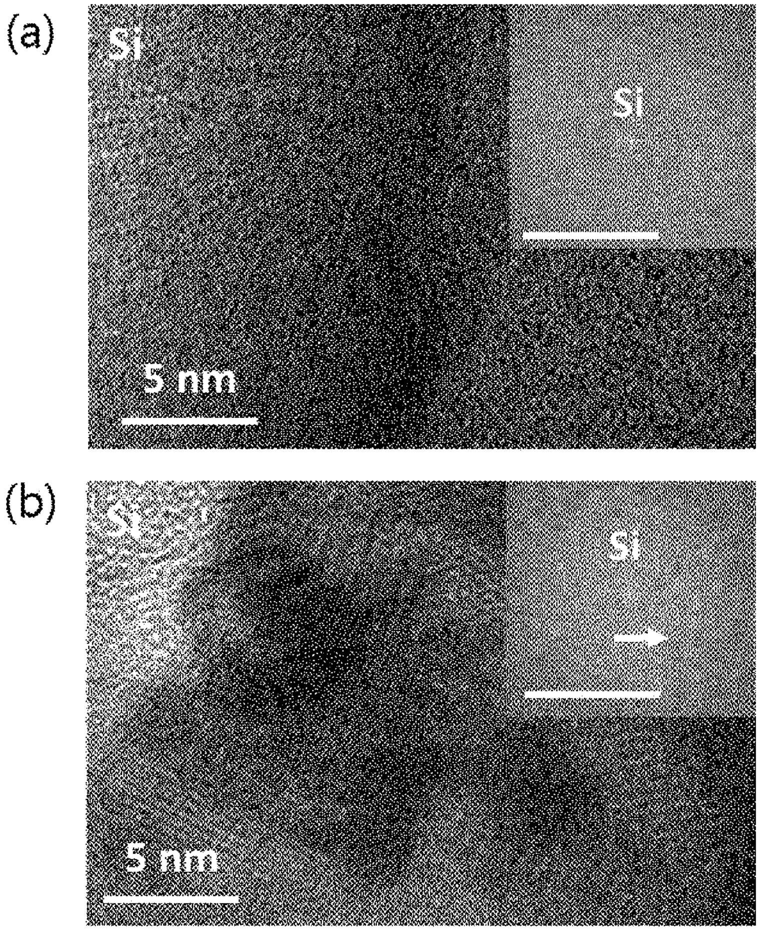

【Fig. 11】
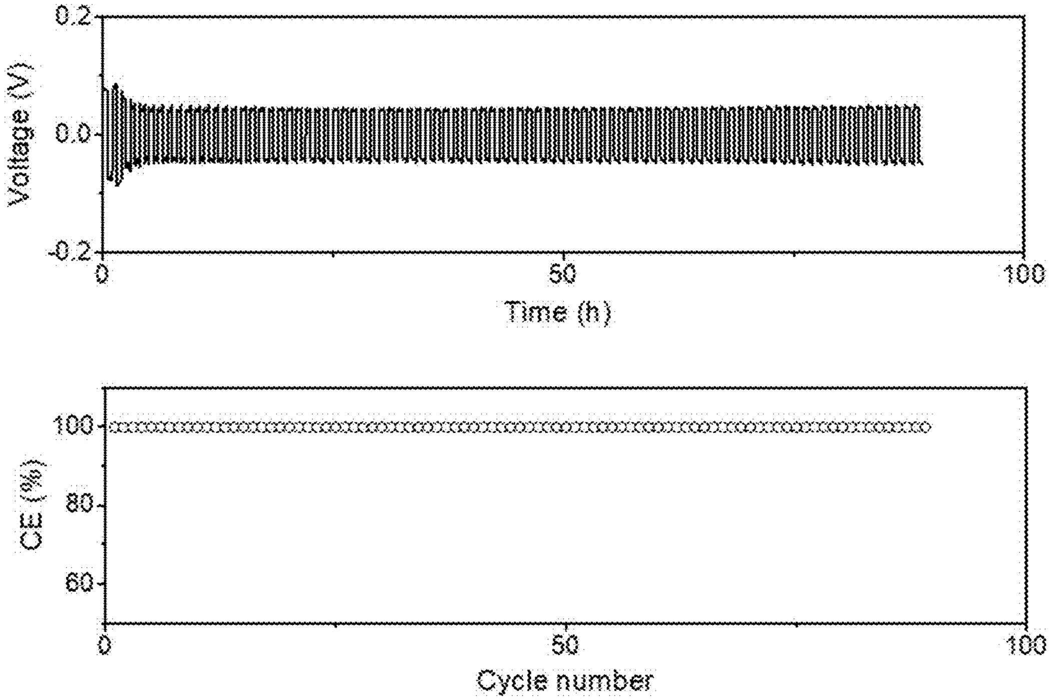

【Fig. 12】
(a)
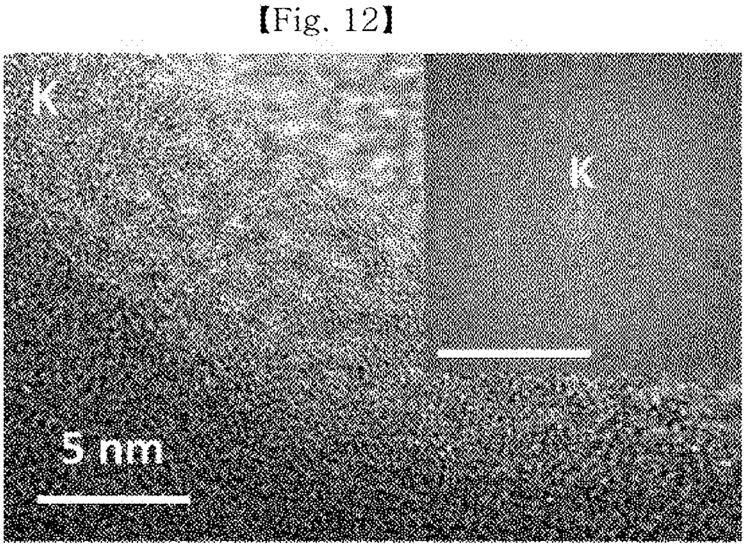
(b)
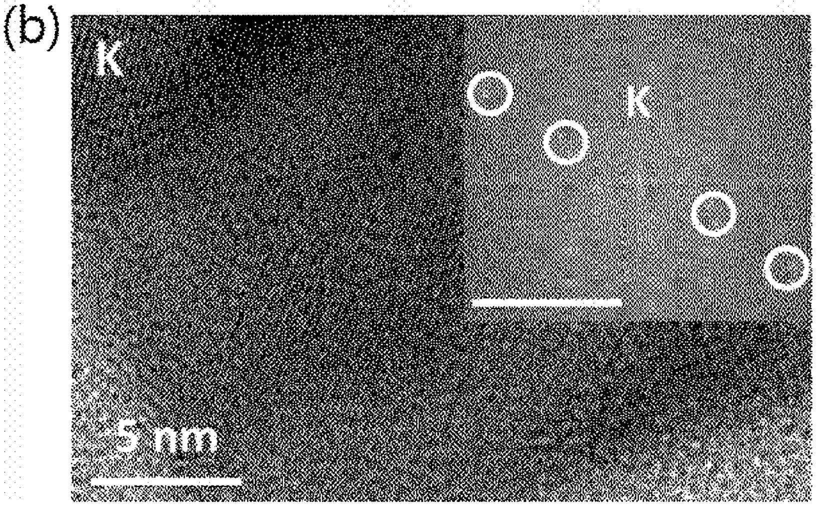

【Fig. 13】
(a)
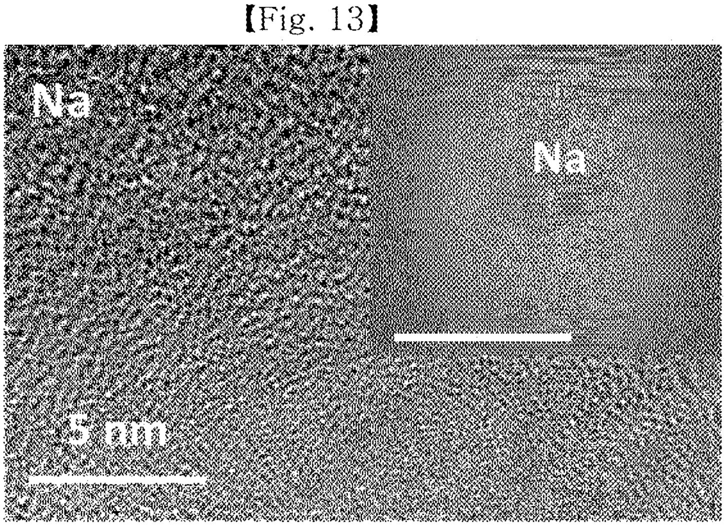
(b)
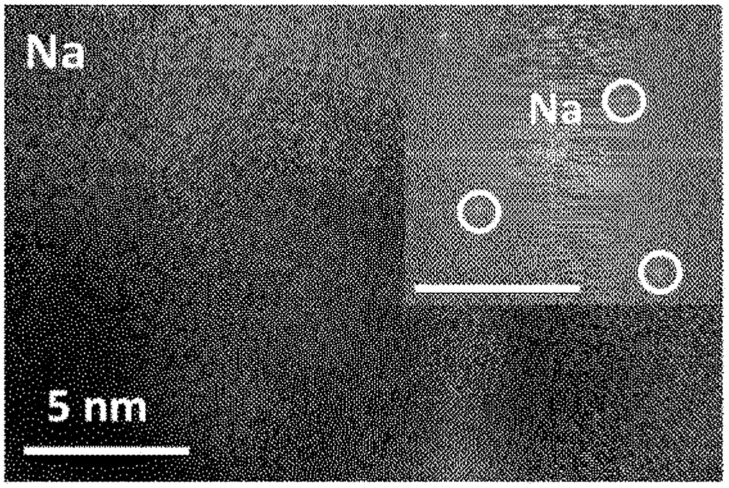

【Fig. 14】
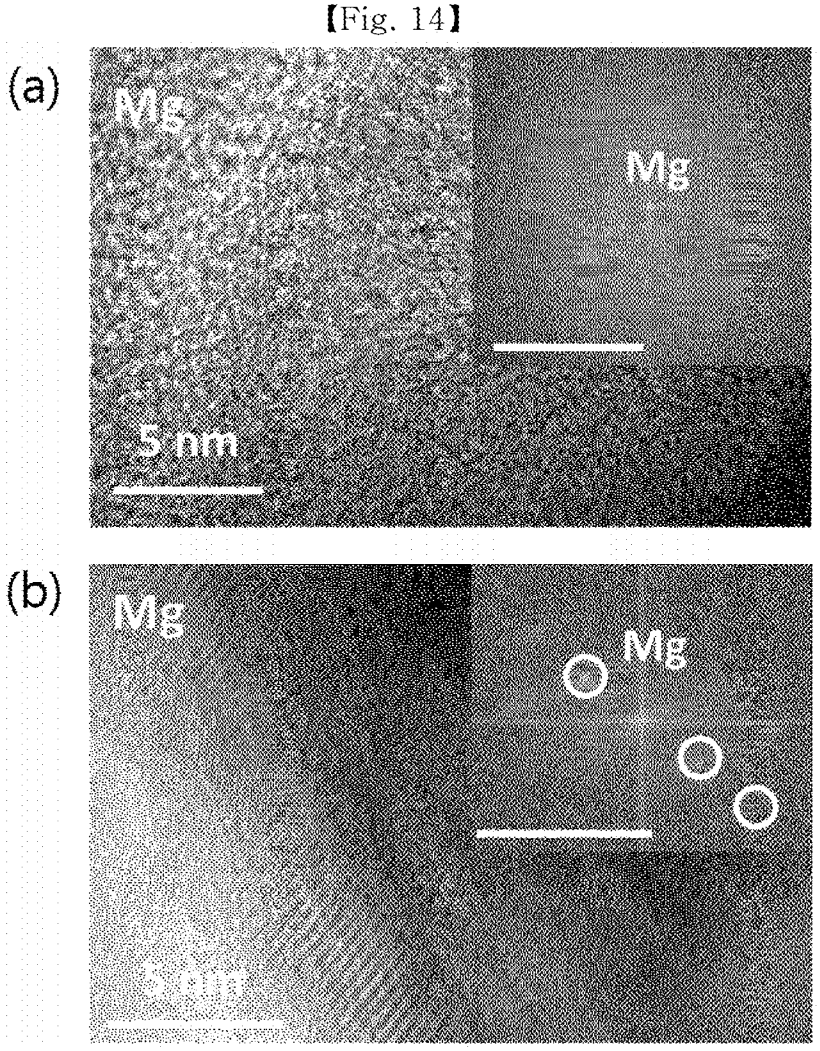

【Fig. 15】
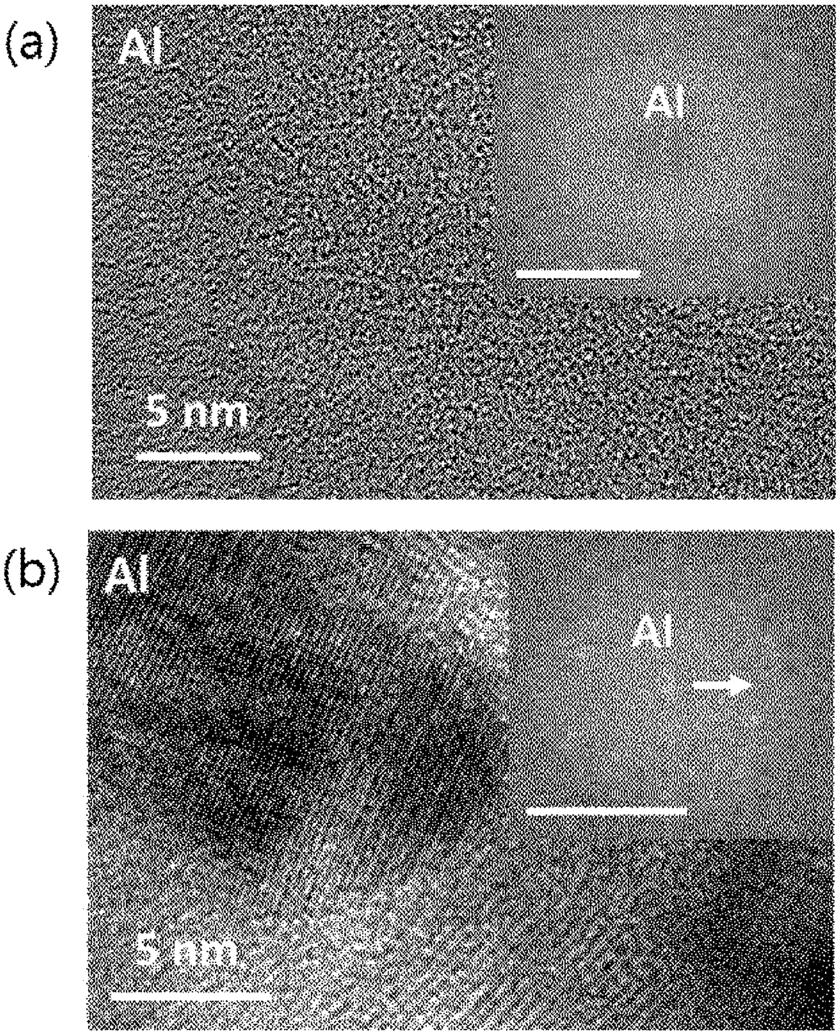

【Fig. 16】
(a)
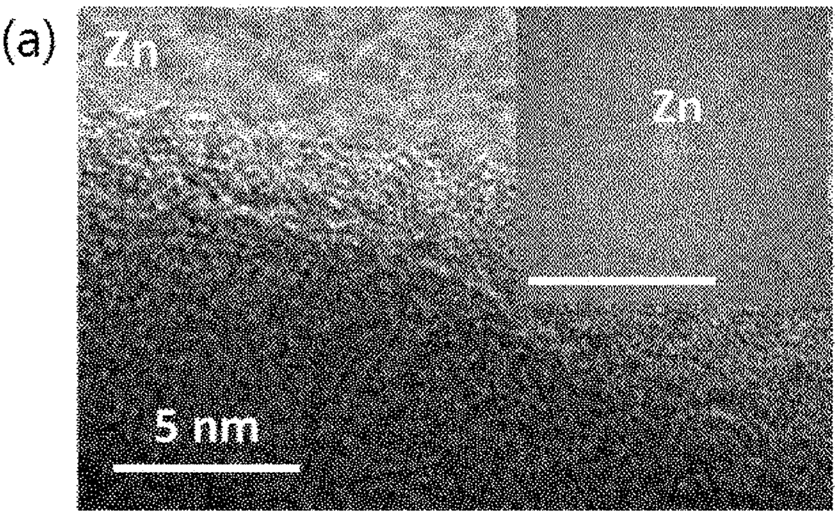
(b)
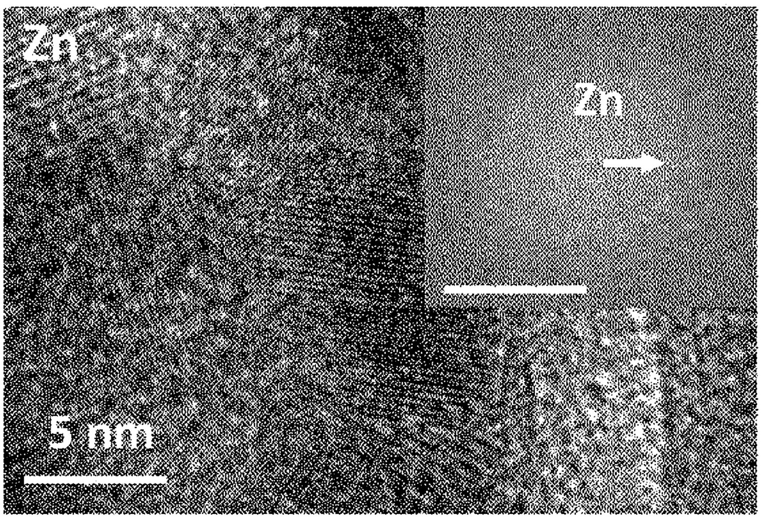

【Fig. 17】
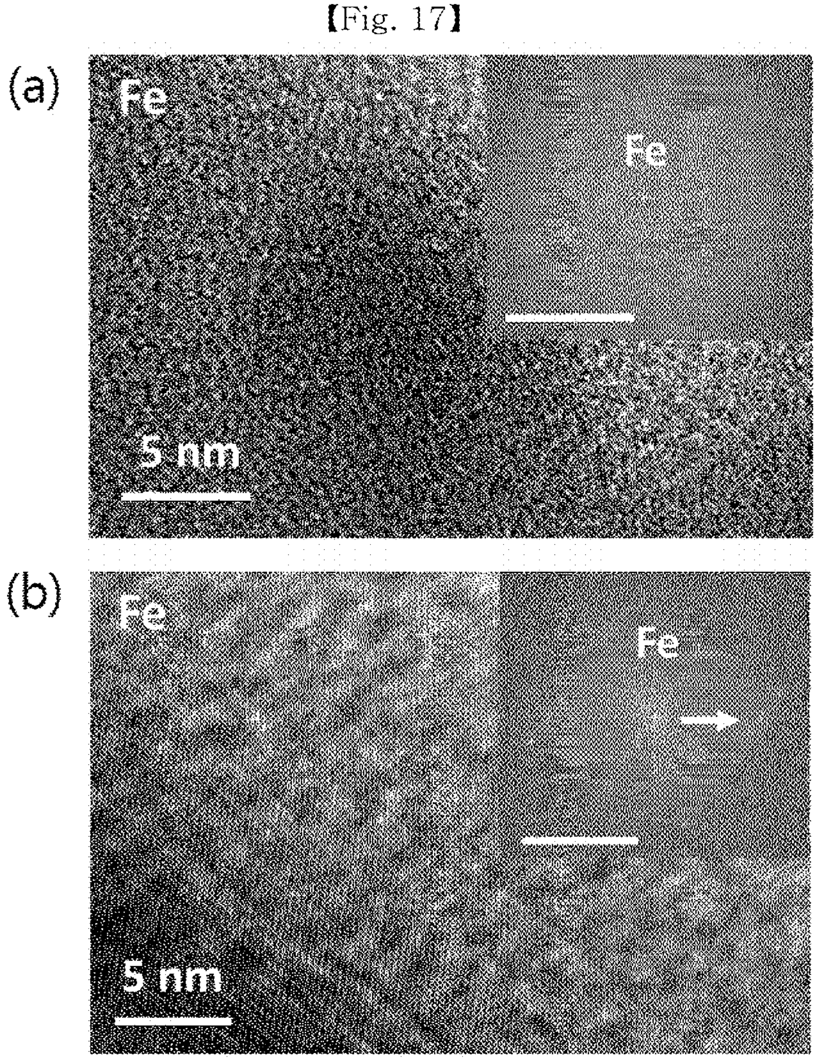

【Fig. 18】
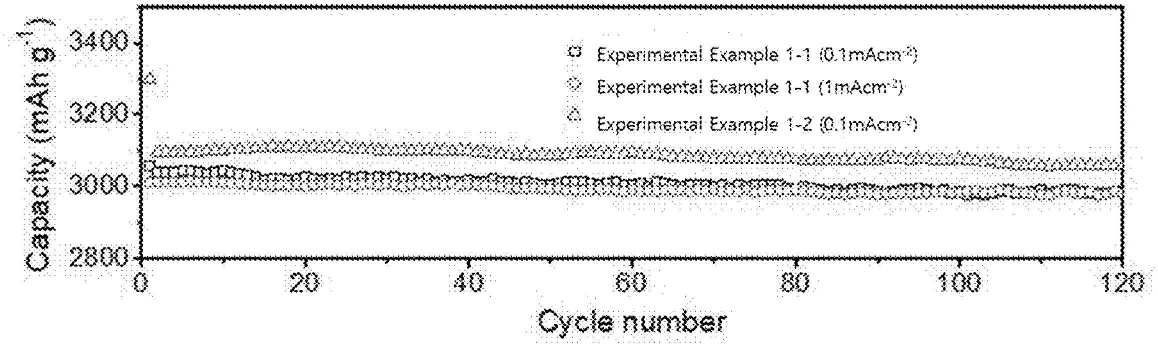
【Fig. 19】
(a)
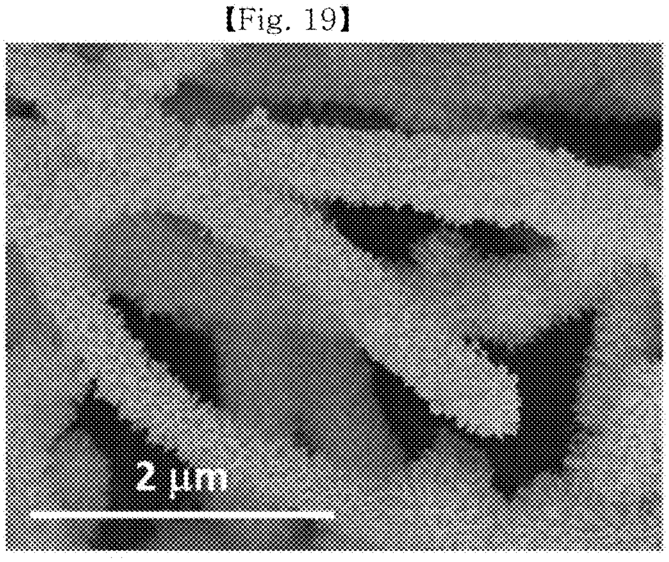
(b)
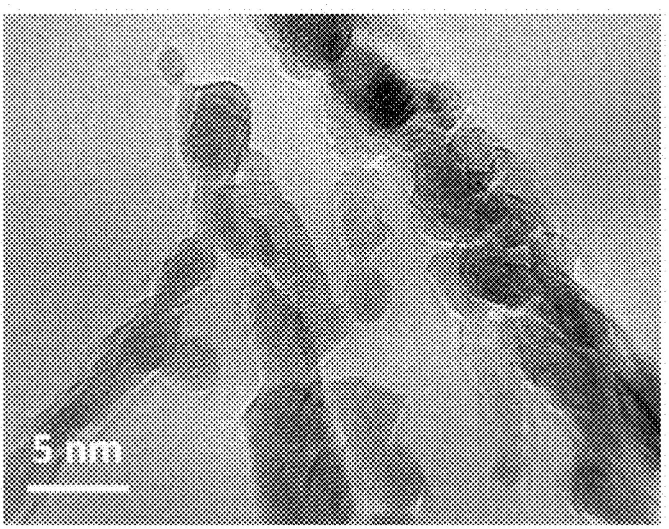

【Fig. 20】
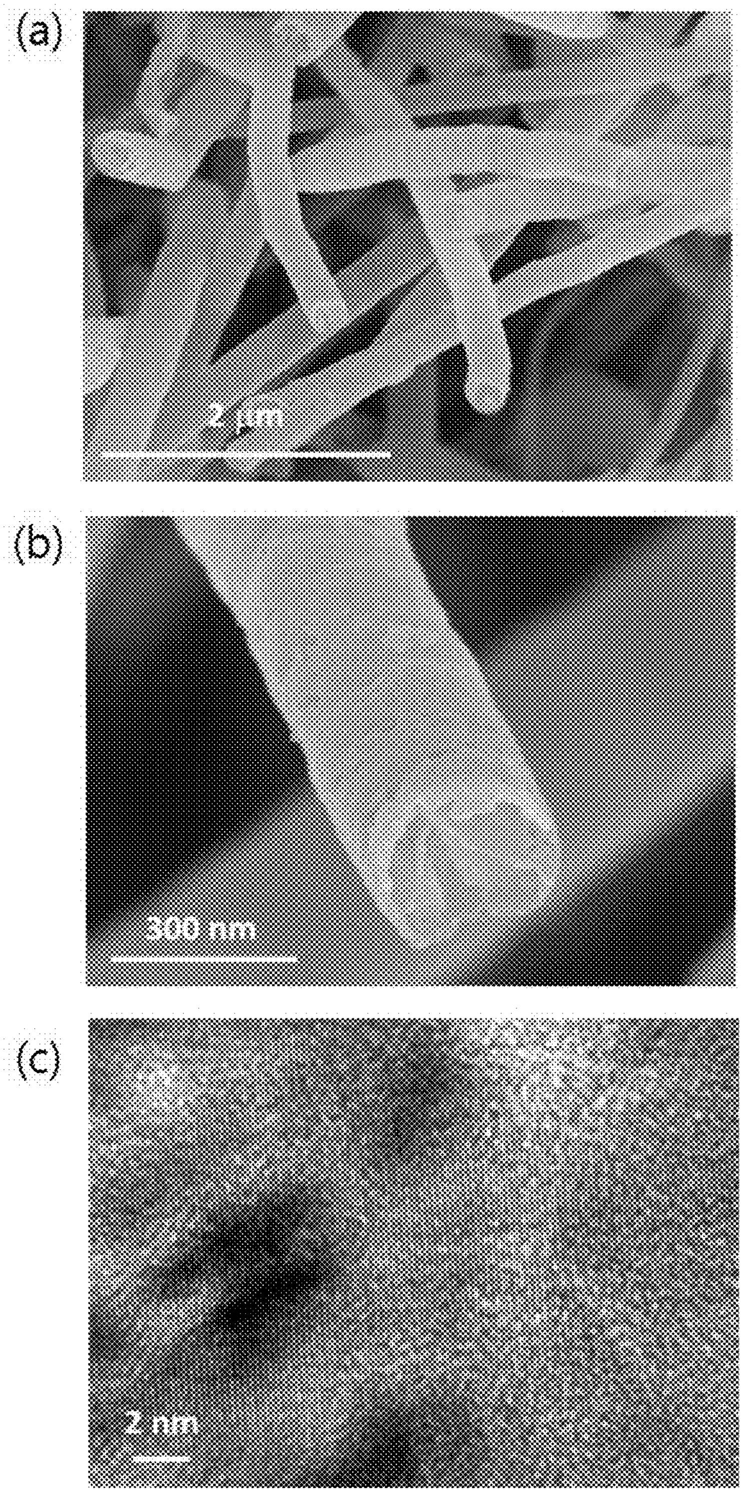

【Fig. 21】
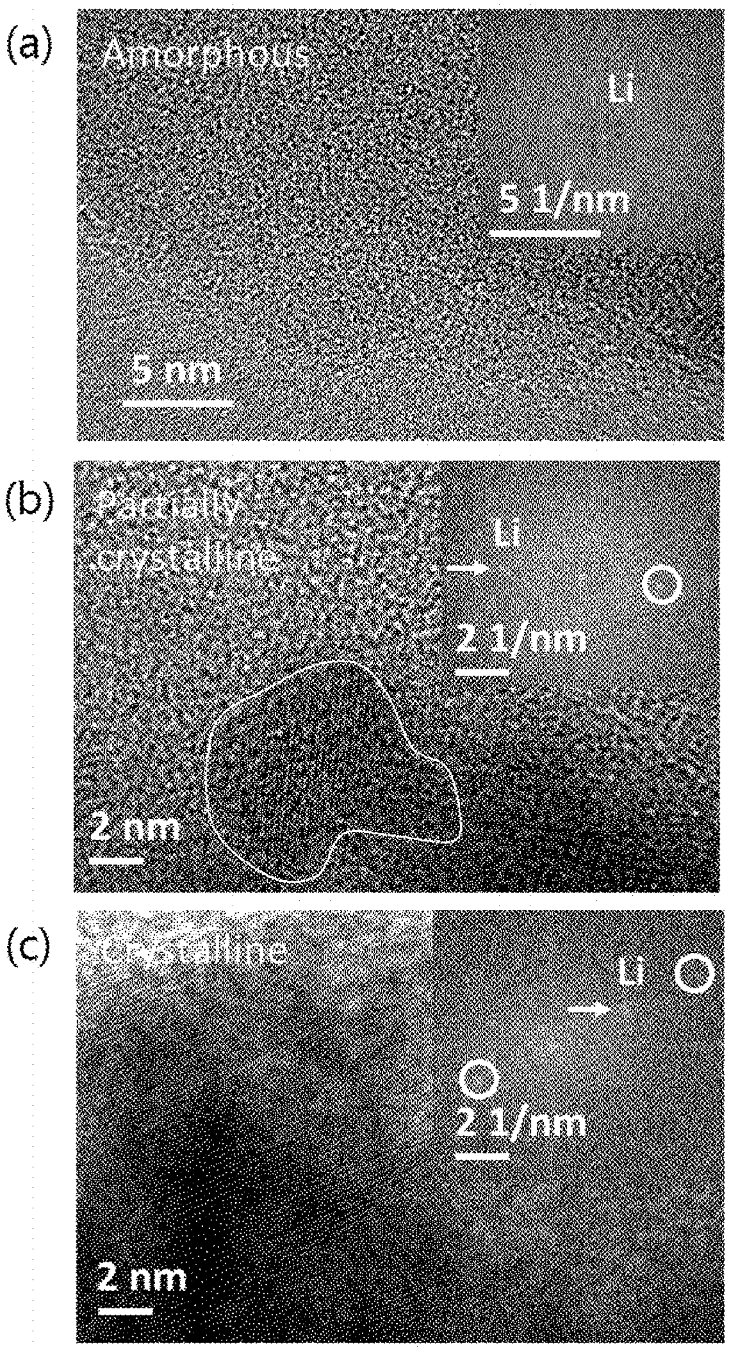

【Fig. 22】
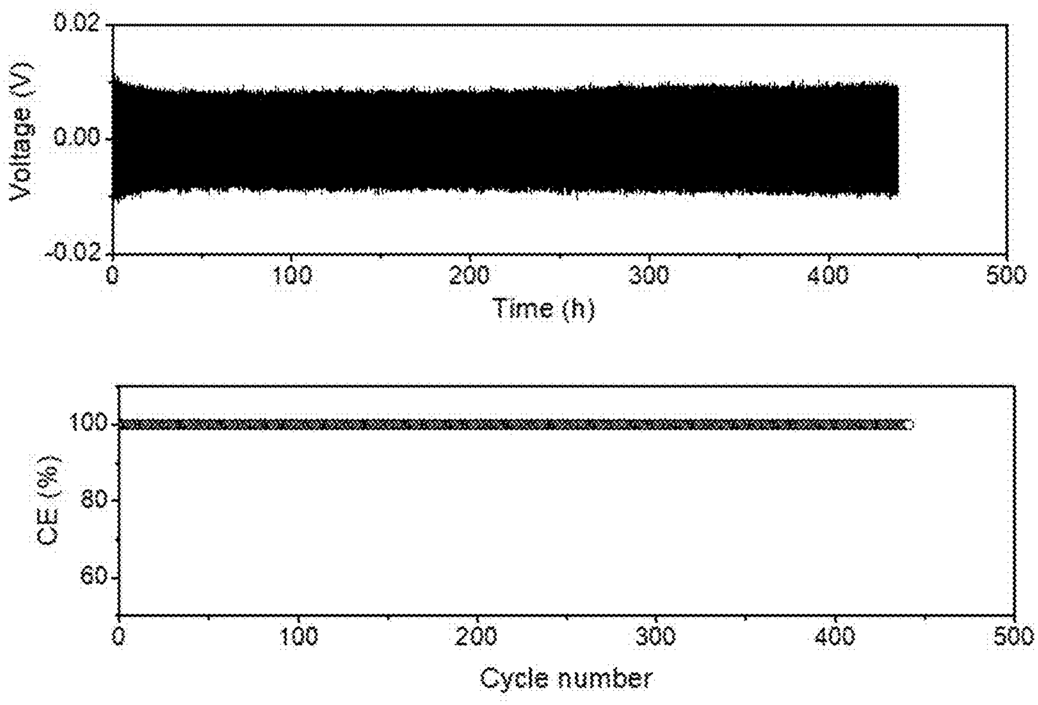
【Fig. 23】
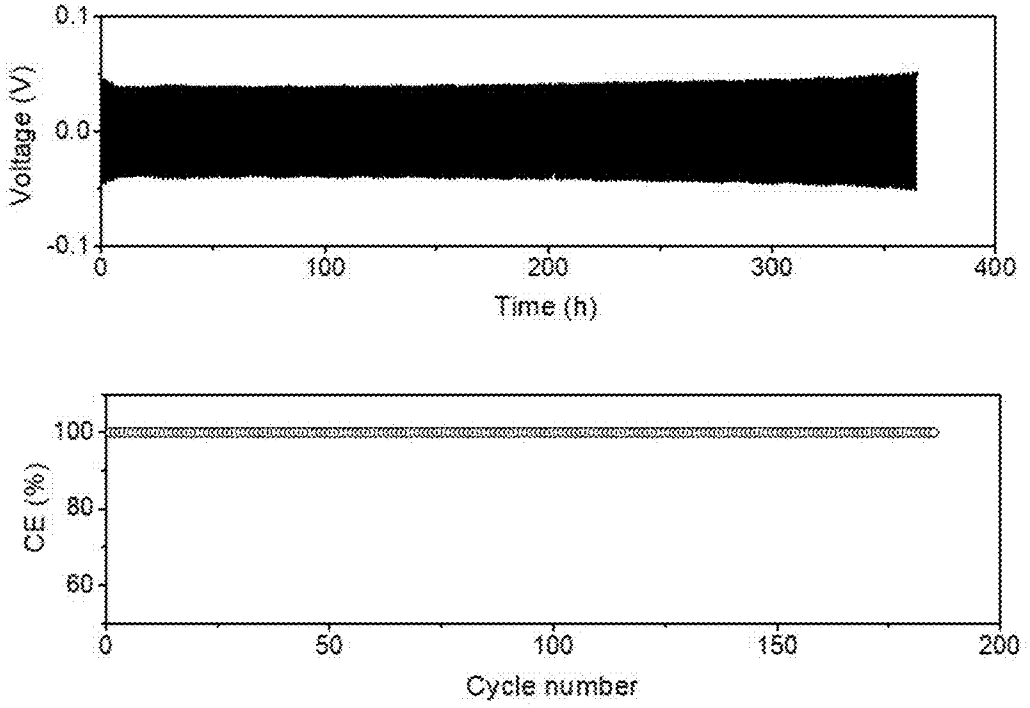

【Fig. 24】
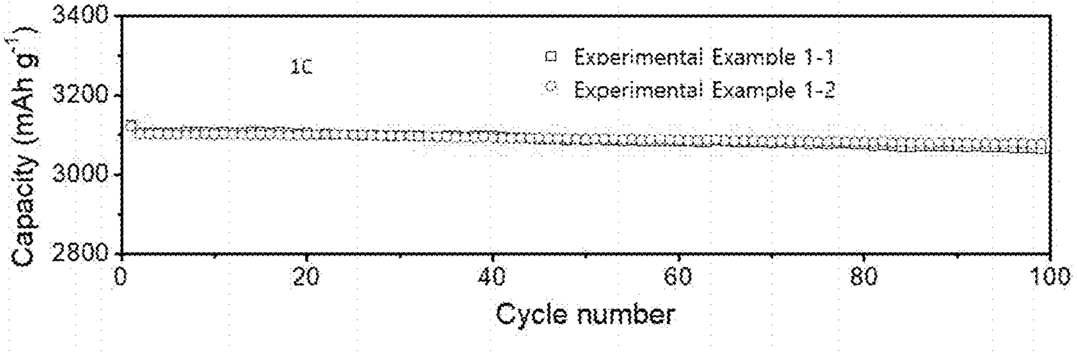
【Fig. 25】
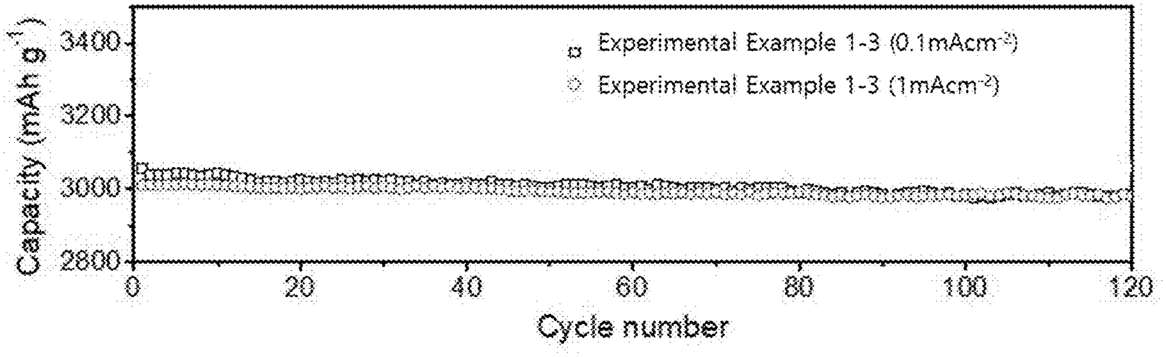

【Fig. 26】
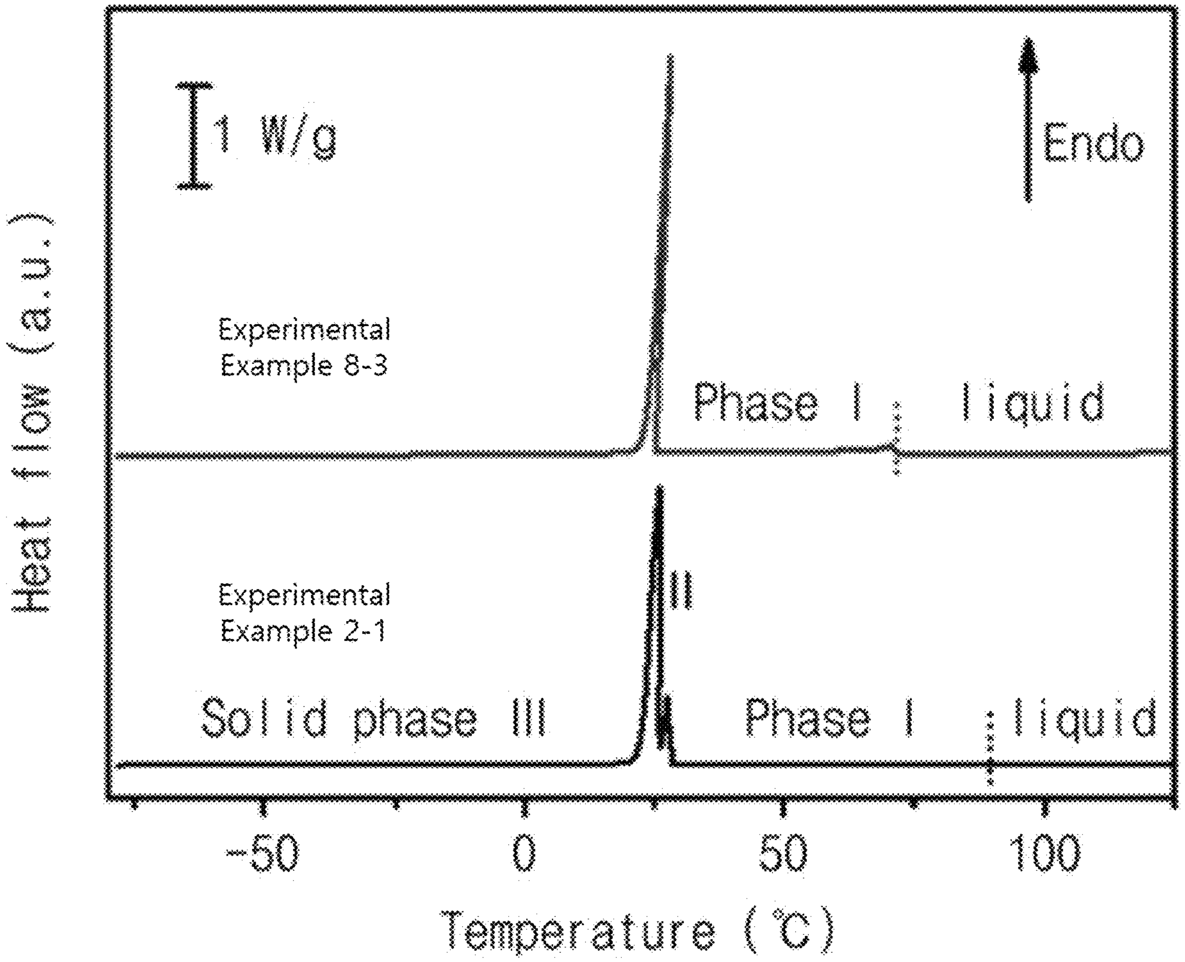

【Fig. 27】
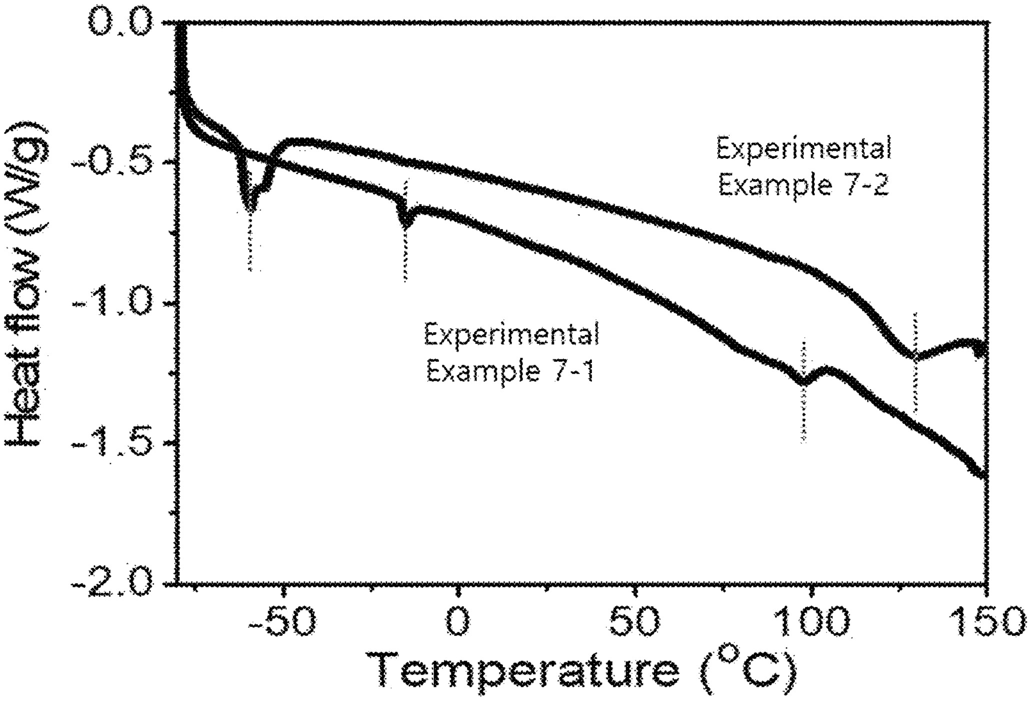
【Fig. 28】
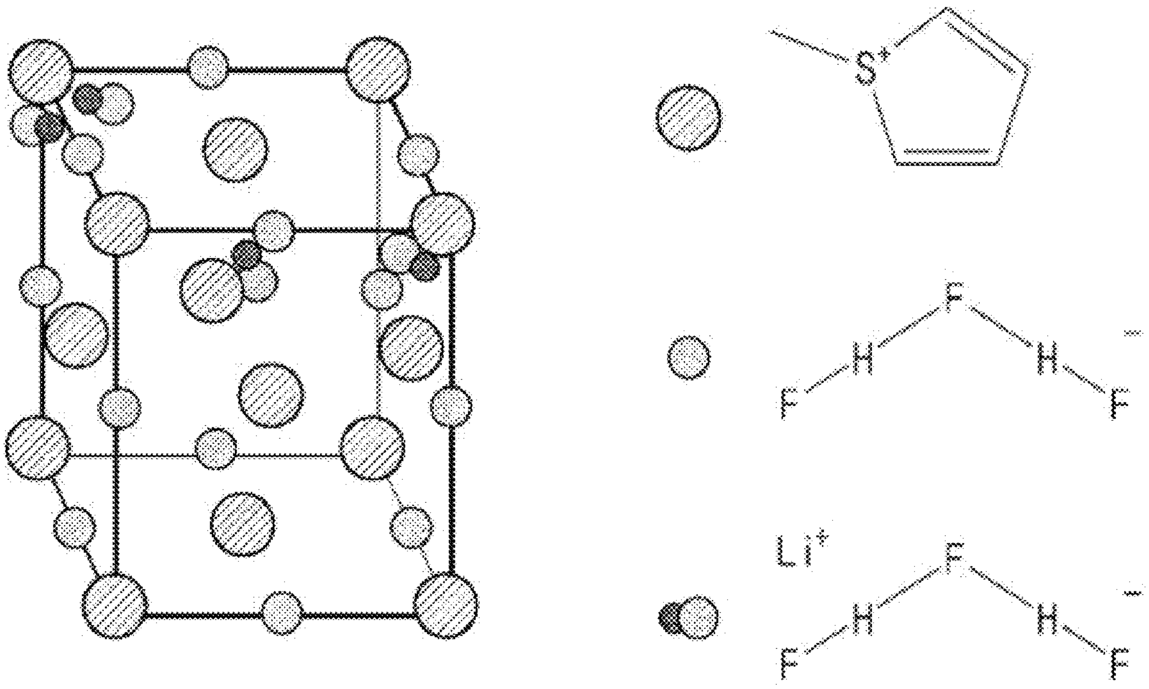

【Fig. 29】
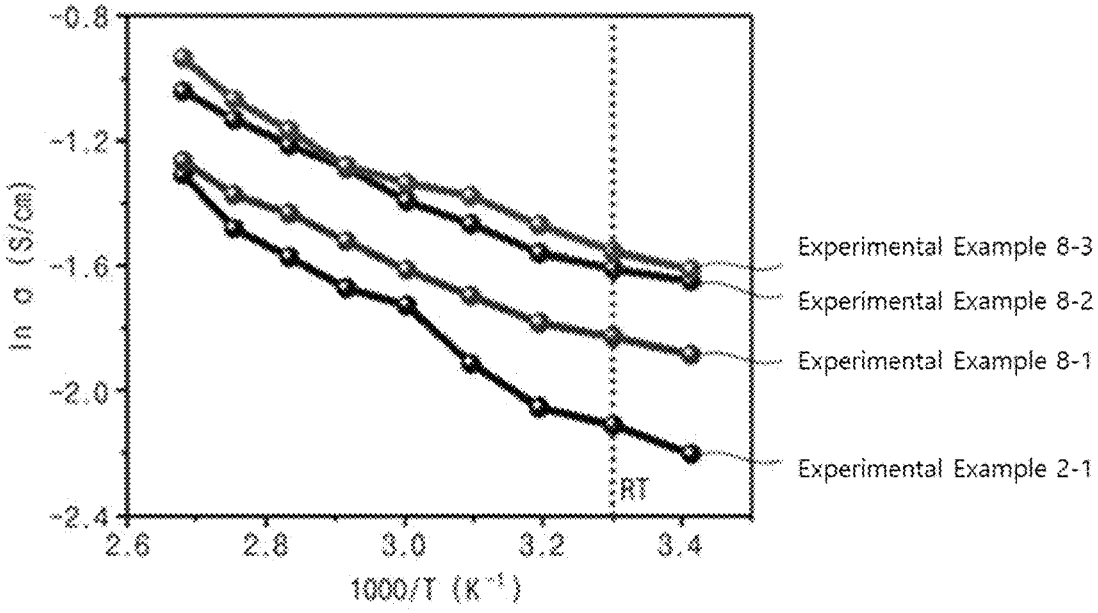
【Fig. 30】
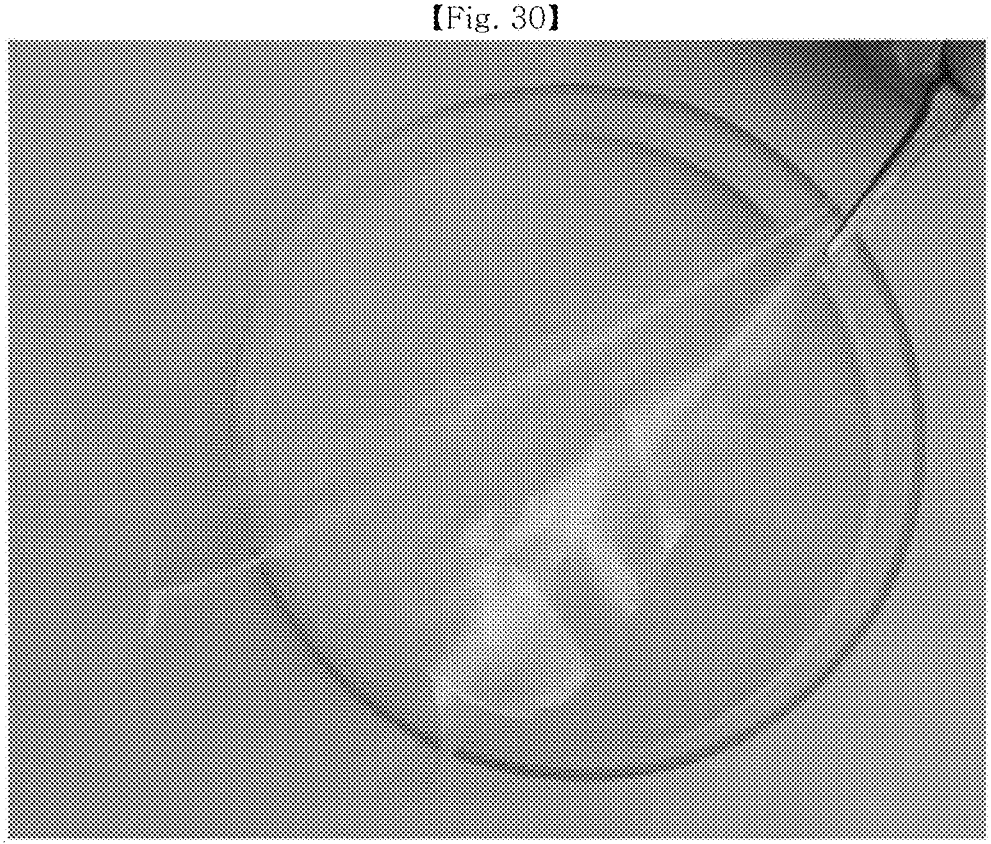

ANODE, METHOD FOR MANUFACTURING SAME BY USING ELECTROLYTIC DEPOSITION, AND DEVICE FOR MANUFACTURING SAME

TECHNICAL FIELD

The present application relates to an anode electrode, a method for manufacturing the same, and a device for manufacturing the same, and more particularly, to an anode electrode including an anode active material layer manufactured by using electrolytic deposition, a method for manufacturing the same, and a device for manufacturing the same.

In addition, the present application relates to an anode electrode including an anode active material layer provided on a three dimensional current collector, and a method for manufacturing the same.

BACKGROUND ART

Small IT devices such as smart phones, etc., took lead in initial growth of a global secondary battery market, but recently, a secondary battery market for vehicles is rapidly growing with the growth of an electric vehicle market.

Secondary batteries for vehicles are leading the growth of the electric vehicle market while enabling mass production through product standardization and achieving low price and stable performance through technology development, and the market is rapidly expanding as a short mileage, which was pointed out as a limitation of electric vehicles, has been resolved by improving battery performance.

With an explosive increase in the demand for secondary batteries, next-generation secondary batteries are also being actively developed to meet the safety issues of secondary batteries and the demand for increased battery capacity.

For example, Korean Patent Registration Publication No. 10-1788232 discloses an electrode for a secondary battery in which an electrode mixture including an electrode active material and a binder is coated on a current collector, and in which the electrode includes: a first electrode mixture layer which contains an electrode active material and a first binder having a glass transition temperature (Tg) lower than that of a second binder and is coated on the current collector; and a second electrode mixture layer which contains an electrode active material and a second binder having a glass transition temperature (Tg) higher than that of the first binder and is coated on the first electrode mixture layer, in which a glass transition temperature (Tg) of the first binder is 15° C. or less; the glass transition temperature (Tg) of the second binder is 10° C. or more in a range higher than the glass transition temperature of the first binder; the glass transition temperature (Tg) of the second binder is 10° C. or more to less than 25° C. in a range higher than the glass transition temperature of the first binder; the electrode for the secondary battery is an anode; and the electrode active material includes a Si-based material.

DISCLOSURE

Technical Problem

One technical object of the present application is to provide an anode electrode, a method for manufacturing the same, and a device for manufacturing the same.

Another technical object of the present application is to provide an anode electrode manufactured by using electrolytic deposition, a method for manufacturing the same, and a device for manufacturing the same.

Still another technical object of the present application is to provide an anode electrode for a secondary battery having high stability and long lifespan, a method for manufacturing the same, and a device for manufacturing the same.

Still another technical object of the present application is to provide an anode electrode for an all-solid-state battery, a method for manufacturing the same, and a device for manufacturing the same.

Still another technical object of the present application is to provide a highly reliable anode electrode with minimized dendrite formation, a method for manufacturing the same, and a device for manufacturing the same.

Still another technical object of the present application is to provide a three dimensional anode electrode and a method for manufacturing the same.

Still another technical object of the present application is to provide a three dimensional anode electrode manufactured by using electrolytic deposition and a method for manufacturing the same.

The technical objects of the present application are not limited to the above.

Technical Solution

To solve the above technical objects, the present application may provide a method for manufacturing an anode electrode.

According to one embodiment, there may be provided a device for manufacturing an anode electrode including a current collector and an anode active material layer provided on the current collector and including a base metal, in which the device for manufacturing an anode electrode includes a container in which an electrolytic solution containing a metal salt having the base metal is accommodated and which has a current collector provided in the electrolytic solution, and a power supply unit for applying a current to the current collector, and in which the base metal included in the metal salt is deposited on the current collector to form the anode active material layer by the current applied to the current collector due to the power supply unit.

According to one embodiment, the power supply unit may control the current density applied to the current collector to control a degree of crystallinity of the anode active material layer including the base metal.

According to one embodiment, the degree of crystallinity of the anode active material layer may increase as the current density applied to the current collector by the power supply unit increases.

According to one embodiment, the base metal may include at least any one of lithium, sodium, potassium, magnesium, aluminum, zinc, iron, or silicon.

To solve the above technical objects, the present application may provide an anode electrode.

According to one embodiment, the anode electrode may include a current collector and an anode active material layer disposed on the current collector and including a base metal, in which the anode active material layer may have a plurality of crystalline regions randomly distributed to be spaced apart from each other in an amorphous region.

According to one embodiment, the anode active material layer may be electrolytically deposited by using an electrolytic solution containing a metal salt having the base metal.

According to one embodiment, a thickness of the anode active material layer may be 50 um or more and 100 um or less.

According to one embodiment, the anode active material layer may have a proportion of the amorphous region higher than a combined proportion of the plurality of crystalline regions.

To solve the above technical objects, the present application may provide a secondary battery.

According to one embodiment, the secondary battery may include an anode electrode according to the embodiment described above, a cathode electrode on the anode electrode, and a solid electrolyte between the anode electrode and the cathode electrode.

To solve the above technical objects, the present application may provide a method for manufacturing an anode electrode.

According to one embodiment, the method for manufacturing an anode electrode may include: preparing an electrolytic solution containing a metal salt having a base metal; immersing a current collector in the electrolytic solution; and applying current to the current collector immersed in the electrolytic solution so as to deposit, on the current collector, the base metal included in the metal salt, thereby forming an anode active material on the current collector.

According to one embodiment, the electrolytic solution may further include a solvent in addition to the metal salt, and the metal salt may include a compound of the base metal, fluorine, and hydrogen.

According to one embodiment, a degree of crystallinity of the anode active material layer formed of the base metal may be controlled according to the current density applied to the current collector.

According to one embodiment, the metal salt may include at least any one of lithium fluorohydrogenate, lithium bis(fluorosulfonyl)imide, or lithium bis(trifluorosulfonyl)imide, include at least any one of sodium fluorohydrogenate or sodium hexafluorophosphate, include at least any one of potassium fluorohydrogenate or potassium hexafluorophosphate, include at least any one of magnesium fluorohydrogenate or phenyl magnesium chloride, include at least any one of aluminum fluorohydrogenate or aluminum chloride, include at least any one of zinc fluorohydrogenate or zinc bis(trifluoromethanesulfonyl)imide, or include at least any one of iron fluorohydrogenate or iron tris(trifluoromethylsulfonyl)imide.

To solve the above technical objects, the present application may provide an anode electrode.

According to one embodiment, the anode electrode may include a three dimensional current collector and an anode active material layer provided on a surface of the three dimensional current collector.

According to one embodiment, the three dimensional current collector may have a form in which a plurality of fibers constitute a network, and the anode active material layer may be deposited on the surface of the plurality of fibers.

According to one embodiment, the anode active material layer may be provided on the surface of the plurality of fibers to provide a pore between the plurality of fibers.

According to one embodiment, the anode active material layer may include at least any one of lithium, sodium, potassium, magnesium, aluminum, zinc, iron, or silicon.

According to one embodiment, the anode active material layer may have both an amorphous region and a crystalline region.

According to one embodiment, the anode active material layer may have a proportion of the crystalline region higher than a proportion of the amorphous region.

According to one embodiment, the three dimensional current collector may include a metal nanowire or a metal nanotube.

To solve the above technical objects, the present application may provide a secondary battery.

According to one embodiment, the secondary battery may include an anode electrode according to the embodiment described above, a cathode electrode on the anode electrode, and a solid electrolyte between the anode electrode and the cathode electrode.

According to one embodiment, the solid electrolyte may include a compound in which a cation and an anion are bound.

To solve the above technical objects, the present application may provide a method for manufacturing an anode electrode.

According to one embodiment, the method for manufacturing an anode electrode may include: preparing a three dimensional current collector and an electrolytic solution containing a metal salt having a base metal; immersing a three dimensional current collector in the electrolytic solution; and applying current to the three dimensional current collector immersed in the electrolytic solution so as to deposit, on the three dimensional current collector, the base metal included in the metal salt, thereby forming an anode active material on the three dimensional current collector.

According to one embodiment, a degree of crystallinity of the anode active material layer formed of the base metal may be controlled according to the current density applied to the three dimensional current collector.

According to one embodiment, the electrolytic solution may further include a solvent in addition to the metal salt, and the metal salt may include a compound of the base metal, fluorine, and hydrogen.

According to one embodiment, the three dimensional current collector may have a form in which a plurality of fibers constitute a network, and a thickness of the anode active material layer may be controlled to be thinner than a diameter of the section of the fiber according to the time and density of current applied to the three dimensional current collector.

Advantageous Effects

According to one embodiment of the present application, an anode active material layer can be formed by preparing an electrolytic solution containing a metal salt having a base metal, and immersing a current collector in the electrolytic solution and then applying current to the current collector, so as to deposit the base metal on the current collector.

A degree of crystallinity and/or thickness of the anode active material layer can be easily controlled by a simple process of controlling the current density applied to the current collector and/or the time for applying the current. Accordingly, the method for manufacturing an anode with less manufacturing cost and time can be provided.

In addition, the anode active material layer can include an amorphous region to minimize a dendrite formation on the anode active material layer during charging and discharging of a secondary battery, thereby providing an anode for a secondary battery having a long lifespan and high stability.

In addition, an anode electrode according to an embodiment of the present application can include a three dimensional current collector and an anode active material layer provided on the surface of the three dimensional current collector. The three dimensional current collector may have a form in which a plurality of fibers constitute a network, and the anode active material layer can be deposited on the surface of the plurality of fibers to a thin thickness.

Accordingly, the anode electrode can have a porous structure having a high specific surface area and have nucleation sites for dendrite growth dispersed during charging and discharging of a secondary battery including the anode electrode, so as to suppress the dendrite growth and lower a mass transfer energy barrier of ions and electrons of a base metal constituting the anode active material layer due to the anode active material layer having a thin thickness and a high degree of crystallinity, thereby enhancing charge/discharge efficiency of the secondary battery.

DESCRIPTION OF DRAWINGS

FIG. 1 is a flowchart for explaining a method for manufacturing an anode electrode according to a first embodiment of the present application.

FIG. 2 is a view for explaining an anode electrode according to a first embodiment of the present application.

FIG. 3 is a view for explaining an anode active material layer of an anode electrode according to a first embodiment of the present application.

FIG. 4 is a flowchart for explaining a method of manufacturing a three dimensional anode electrode according to a second embodiment of the present invention.

FIG. 5 is a view for explaining a three dimensional anode electrode according to a second embodiment of the present invention.

FIG. 6 is a view for explaining a secondary battery according to an embodiment of the present application.

FIG. 7 is a view showing TEM pictures and FFT patterns of an anode electrode according to Experimental Example 1-1 of the present application.

FIG. 8 is a graph for explaining charge/discharge properties of a second battery including an anode electrode manufactured by applying a current density of 0.1 $mAcm^{-2}$ according to Experimental Example 1-1 of the present application.

FIG. 9 is a graph for explaining charge/discharge properties of a second battery including an anode electrode manufactured by applying a current density of 1 $mAcm^{-2}$ according to Experimental Example 1-1 of the present application.

FIG. 10 is a view showing TEM pictures and FFT patterns of an anode electrode according to Experimental Example 1-2 of the present application.

FIG. 11 is a graph for explaining charge/discharge properties of a second battery including an anode electrode manufactured by applying a current density of 0.1 $mAcm^{-2}$ according to Experimental Example 1-2 of the present application.

FIG. 12 is a view showing TEM pictures and FFT patterns of an anode electrode according to Experimental Example 1-3 of the present application.

FIG. 13 is a view showing TEM pictures and FFT patterns of an anode electrode according to Experimental Example 1-4 of the present application.

FIG. 14 is a view showing TEM pictures and FFT patterns of an anode electrode according to Experimental Example 1-5 of the present application.

FIG. 15 is a view showing TEM pictures and FFT patterns of an anode electrode according to Experimental Example 1-6 of the present application.

FIG. 16 is a view showing TEM pictures and FFT patterns of an anode electrode according to Experimental Example 1-7 of the present application.

FIG. 17 is a view showing TEM pictures and FFT patterns of an anode electrode according to Experimental Example 1-8 of the present application.

FIG. 18 is a graph for comparing and explaining charge/discharge properties of a second battery including an anode electrode according to Experimental Examples 1-1 and 1-2 of the present application.

FIG. 19 is a view showing SEM pictures and TEM pictures of an anode electrode according to Experimental Example 1-9 of the present application.

FIG. 20 is a view showing SEM pictures and TEM pictures of an anode electrode according to Experimental Example 1-10 of the present application.

FIG. 21 is a view showing TEM pictures and FFT patterns of an anode electrode according to Experimental Example 1-11 of the present application.

FIG. 22 is a graph for explaining charge/discharge properties of a second battery including an anode electrode manufactured according to Experimental Example 1-9 of the present application.

FIG. 23 is a graph for explaining charge/discharge properties of a second battery including an anode electrode manufactured according to Experimental Example 1-10 of the present application.

FIG. 24 is a graph for explaining charge/discharge properties of a second battery including an anode manufactured according to Experimental Examples 1-9 and 1-10 of the present application.

FIG. 25 is a graph for explaining charge/discharge properties of a second battery including an anode manufactured according to Experimental Example 1-11 of the present application.

FIG. 26 is a differential scanning calorimetry (DSC) graph showing a compound according to Experimental Example 2-1 and a solid electrolyte according to Experimental Example 8-3 of the present application.

FIG. 27 is a DSC graph showing compounds according to Experimental Examples 7-1 and 7-2 of the present application.

FIG. 28 is a view for explaining a crystal structure of solid electrolytes according to Experimental Examples 8-1 to 8-3 of the present application.

FIG. 29 is a graph showing an ionic conductivity depending on a temperature of a compound according to Experimental Example 2-1 and a solid electrolyte according to Experimental Examples 8-1 to 8-3 of the present application.

FIG. 30 is a view showing pictures of a electrolyte membrane coated with a solid electrolyte according to Experimental Example 8-1 of the present application.

MODE FOR INVENTION

Hereinafter, preferred embodiments of the present application will be described in detail with reference to the accompanying drawings. However, the technical idea of the present application is not limited to the embodiments described herein and may be implemented in other forms. Rather, the embodiments introduced herein are provided to sufficiently deliver the spirit of the present application to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present specification, the terms such as first, second, and third are used to describe various elements, but the elements are not limited to the terms. These terms are used only to distinguish one component from another component. Accordingly, an element mentioned as a first element in one embodiment may be mentioned as a second element in another embodiment. The embodiments described and illustrated herein also include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present application, a detailed description of known functions or configurations incorporated herein will be omitted when it may make the subject matter of the present invention unnecessarily unclear.

According to a first embodiment of the present application, an anode electrode, a method for manufacturing the same by using electrolytic deposition, and a device for manufacturing the same will be described.

FIG. 1 is a flowchart for explaining a method of manufacturing an anode electrode according to a first embodiment of the present application, FIG. 2 is a view for explaining an anode electrode according to a first embodiment of the present application, and FIG. 3 is a view for explaining an anode active material layer of an anode electrode according to a first embodiment of the present application.

Referring to FIGS. 1 to 3, an electrolytic solution containing a metal salt having a base metal may be prepared (S110). The electrolytic solution may be prepared in a container, and the electrolytic solution may be accommodated in the container.

The electrolytic solution may be a solution in which the metal salt and the solvent are mixed. The solvent may include at least any one of 1,2-dimethoxyethane (DME), 1,1,2,2-tetrafluoroethyl-2,2,3,3-tetrafluoropropyl ether (TTE), ethylene carbonate (EC), ethyl methyl carbonate (DMC), tetrahydrofuran (THF), propylene carbonate (PC), or triethylamine hydrochloride.

The base metal may be an element constituting the anode active material layer 110 to be described later. According to one embodiment, the base metal may include at least any one of lithium, sodium, potassium, magnesium, aluminum, zinc, iron, or silicon.

The metal salt may be selected as a compound including the base metal as described above, but having high ionic conductivity. Accordingly, as will be described later, when the anode active material layer 110 is deposited on a current collector 100 by using the electrolytic solution containing the metal salt, a deposition speed and rate of the anode active material layer 110 may be enhanced with less process time and cost.

When the base metal includes lithium, the metal salt may include at least any one of lithium fluorohydrogenate (LiFHF), lithium bis(fluorosulfonyl)imide (LiFSI), or lithium bis(trifluorosulfonyl)imide (LiTFSI). In this case, 1,2-dimethoxyethane (DME), and 1,1,2,2-tetrafluoroethyl-2,2,3,3-tetrafluoropropyl ether (TTE) may be used as the solvent.

When the base metal includes sodium, the metal salt may include at least any one of sodium fluorohydrogenate (Na$(FHF)_x$, x>0) or sodium hexafluorophosphate ($NaPF_6$). In this case, ethylene carbonate (EC) and ethyl methyl carbonate (DMC) may be used as the solvent.

When the base metal includes potassium, the metal salt may include at least any one of potassium fluorohydrogenate (K$(FHF)_x$, x>0) or potassium hexafluorophosphate ($KPF_6$). In this case, 1,2-dimethoxyethane (DME) may be used as the solvent.

When the base metal includes magnesium, the metal salt may include at least any one of magnesium fluorohydrogenate (Mg$(FHF)_x$, x>0) or phenyl magnesium chloride (PhMgCl). In this case, tetrahydrofuran (THF) and aluminium chloride ($AlCl_3$) may be used as the solvent. Magnesium in the metal salt may have a relatively low ionization rate. Thus, as described above, aluminum chloride may be further added into the solvent, and magnesium in the metal salt may be easily ionized. Accordingly, as will be described later, the base metal may be easily coated on the current collector 100.

When the base metal includes aluminum, the metal salt may include at least any one of aluminum fluorohydrogenate (Al$(FHF)_x$, x>0) or aluminum hexafluorophosphate ($AlCl_3$). In this case, tetrahydrofuran (THF) and triethylamine hydrochloride may be used as the solvent. Aluminum in the metal salt may have a relatively low ionization rate. Thus, as described above, triethylamine hydrochloride may be further added into the solvent, and aluminum in the metal salt may be easily ionized. Accordingly, as will be described later, the base metal may be easily coated on the current collector 100.

When the base metal includes zinc, the metal salt may include at least any one of zinc fluorohydrogenate (Zn$(FHF)_x$, x>0) or zinc bis(trifluoromethanesulfonyl)imide ($Zn(TFSI)_2$). In this case, 1,2-dimethoxyethane (DME) may be used as the solvent.

When the base metal includes iron, the metal salt may include at least any one of iron fluorohydrogenate (Fe$(FHF)_x$, x>0) or iron tris(trifluoromethylsulfonyl)imide. In this case, propylene carbonate (PC) may be used as the solvent.

When the base metal includes silicon, the metal salt may include at least any one of silicon fluorohydrogenate (Si$(FHF)_x$, x>0) or silicon bis(fluoromethylsulfonyl)imide. In this case, 1,2-dimethoxyethane (DME) may be used as the solvent.

According to one embodiment, the electrolytic solution may contain different types of the base metal. For example, the electrolytic solution may include at least two of magnesium, silicon, iron, or silicon. A proportion of the metal salt and the solvent, including the different types of the base metal included in the electrolytic solution, may be adjusted according to the proportion of the metal in the deposited anode active material layer 110 to be described later.

The current collector 100 may be immersed in the electrolytic solution (S120).

According to one embodiment, the current collector 100 may have various forms such as a metal film, a metal nanowire, and a metal nanotube. For example, the current collector 100 may be made of copper or a carbon material (carbon fiber, carbon fabric, etc.).

Current may be applied to the current collector 100 immersed in the electrolytic solution and the base metal contained in the metal salt may be deposited onto the current collector 100, so as to form an anode active material layer 110 on the current collector 100 (S130).

A power supply unit for applying current to the current collector 100 may be provided, and the power supply unit may apply current to the current collector 100, so as to deposit the base metal onto the current collector 100.

The current density applied to the current collector 100 may be controlled by the power supply unit, so as to control a degree of crystallinity of the anode active material layer 110 including the base metal.

Specifically, as the current density applied to the current collector 100 increases, the degree of crystallinity of the anode active material layer 110 may increase, and as the current density applied to the current collector 100 decreases, the degree of crystallinity of the anode active material layer 110 may decrease.

For example, when the current density applied to the current collector 100 is 0.1 $mAcm^{-2}$ or less, the anode active material layer 110 may be formed of an amorphous region 112 as shown in (a) of FIG. 3; when the current density applied to the current collector 100 is 0.5 $mAcm^{-2}$ or more, the anode active material layer 110 may be formed in a state in which a plurality of crystalline regions 114 are randomly distributed to be spaced apart from each other in the amorphous region 112 as shown in (b) of FIG. 3; and when the current density applied to the current collector 100 is 1 $mAcm^{-2}$ or less, a size of the crystalline region 114 in the anode active material layer 110 may be increased as shown in (a) of FIG. 3.

As described above, the anode active material layer 110 may have the plurality of crystalline regions 114 distributed to be spaced apart from each other in the amorphous region 112. In this case, a proportion of the amorphous region 112 may be higher than a combined proportion of the plurality of crystalline regions 114.

According to one embodiment, a thickness of the anode active material layer 110 in which the base metal is deposited on the current collector 100 by a method of applying current to the current collector 100 may be 50 μm or more and 100 μm or less. Accordingly, a secondary battery manufactured by using an anode electrode including the anode active material layer 110 may be stably driven.

Unlike the above, if a thickness of the anode active material layer 110 is less than 50 μm, a secondary battery may not be stably charged and discharged. When a thickness of the anode active material layer 110 is greater than 100 μm, the anode active material layer 110 may be peeled off from the current collector 100 during a deposition process of the anode active material layer 110 or a charging/discharging process of the secondary battery.

In addition, unlike the embodiment of the present application described above, it may not be easy to deposit the anode active material layer 110 on the current collector 100 to a thickness of 50 μm or more by a vacuum deposition method. As described above, however, when the current collector 100 is immersed in the electrolytic solution and current is applied to the current collector 100 according to the embodiment of the present application, the anode active material layer 110 with a thickness of 50 μm or more may be easily deposited on the current collector 100.

According to an embodiment of the present application, the anode active material layer 110 including the base metal may be formed on the current collector 100 by a simple process of immersing the current collector 100 in the electrolytic solution containing the metal salt having the base metal and applying current to the current collector 100. A degree of crystallinity of the anode active material layer 110 may be easily controlled by a simple process of controlling the current density applied to the current collector 100, and a thickness of the anode active material layer 110 may be controlled by a simple process of controlling the time for applying current to the current collector 100. Accordingly, the method for manufacturing an anode with less manufacturing cost and time may be provided.

In addition, the anode active material layer 110 may include an amorphous region to minimize a dendrite formation on the anode active material layer 110 during charging and discharging of a secondary battery, and the anode active material layer 110 may be manufactured with various elements by a simple method of adjusting a type of the metal salt according to a type of the base metal.

According to a second embodiment of the present application, a three dimensional anode electrode and a method for manufacturing the same will be described.

FIG. 4 is a flowchart for explaining a method of manufacturing a three dimensional anode electrode according to a second embodiment of the present invention, and FIG. 5 is a view of showing a section of a three dimensional anode electrode according to a second embodiment of the present invention.

Referring to FIGS. 4 and 5, a three dimensional current collector 105 and an electrolytic solution containing a metal salt having a base metal may be prepared (S210).

The three dimensional current collector 105 may have a form in which a plurality of fibers constitute a network. In this case, the plurality of fibers may be formed of a metal (e.g., copper, etc.) or a carbon structure (e.g., carbon fiber, etc.), and the three dimensional current collector 105 may include a plurality of pores therein and may have a high surface area. Alternatively, the three dimensional current collector 105 may include a metal nanotube or a metal nanowire.

According to one embodiment, the manufacturing of the three dimensional current collector 105 may include preparing a mixed solution in which a solvent and a reducing agent are mixed, and immersing and reacting a metal substrate in the mixed solution to grow a metal nanowire on the metal substrate. In this case, the metal nanowire may be grown on the metal substrate, and thus the metal substrate having the metal nanowire may have a three dimensional structure and high conductivity at the same time. The base solvent may include an amine-based material such as ethylenediamine and octadecylamine, and may include at least any one of glucose, fructose, sucrose, urea, or KOH. In addition, the reducing agent may include hydrazine.

Alternatively, the solvent may further include a metal salt according to a modified example of the method for manufacturing the three dimensional current collector 105 according to one embodiment mentioned above. For example, the metal salt may include at least any one of metal chloride, metal nitric acid, metal acetate, and metal sulfate. In this case, the three dimensional current collector 105 may be manufactured in a suspended form on the solvent. In other words, the three dimensional current collector 105 may be formed as a sponge type in which metal nanowires form a network with each other.

Alternatively, according to another embodiment, the manufacturing of the three dimensional current collector 105 may include preparing a mixed solution in which a solvent and a reducing agent are mixed, adding an additive to the mixed solution, and immersing and reacting a metal substrate in the mixed solution to which the additive is added so as to grow a metal nanotube on the metal substrate. In this case, the metal nanotube may be grown on the metal substrate, and thus the metal substrate having the metal nanotube may have a three dimensional structure and high conductivity at the same time. The base solvent may include KOH, and may include an amine-based material such as ammonium hydroxide, ethylenediamine, or octadecylamine. The additive may include at least any one of glucose, fructose, sucrose, urea, or KOH. In addition, the reducing agent may include hydrazine.

Alternatively, the solvent may further include a metal salt according to a modified example of the method for manufacturing the three dimensional current collector 105 according to another embodiment mentioned above. For example, the metal salt may include at least any one of metal chloride, metal nitric acid, metal acetate, and metal sulfate. In this case, the metal nanotubes may be agglomerated with each other and provided in the form of powder.

The electrolytic solution may be a solution in which the metal salt and the solvent are mixed as described with reference to FIGS. 1 to 3.

The base metal may be an element constituting the anode active material layer 115 to be described later. According to one embodiment, the base metal may include at least any one of lithium, sodium, potassium, magnesium, aluminum, zinc, iron, or silicon.

The metal salt may be selected as a compound including the base metal as described with reference to FIGS. 1 to 3, but having high ionic conductivity. Accordingly, as will be described later, when the anode active material layer 115 is deposited on a current collector 105 by using the electrolytic solution containing the metal salt, a deposition speed and rate of the anode active material layer 115 may be enhanced with less process time and cost.

The three dimensional current collector 105 may be immersed in the electrolytic solution (S220).

Current may be applied to the three dimensional current collector 105 immersed in the electrolytic solution and the base metal contained in the metal salt may be deposited onto the three dimensional current collector 105, so as to form an anode active material layer 115 on a surface of the three dimensional current collector 105 (S130).

The current density applied to the three dimensional current collector 105 may be controlled to control a degree of crystallinity of the anode active material layer 115 including the base metal.

Specifically, as the current density applied to the three dimensional current collector 105 increases, the degree of crystallinity of the anode active material layer 115 may increase, and as the current density applied to the three dimensional current collector 105 decreases, the degree of crystallinity of the anode active material layer 115 may decrease.

For example, as described with reference to (a) of FIG. 3, the anode active material layer 115 may be formed of an amorphous region 112; as shown in (b) of FIG. 3, the anode active material layer 115 may be formed in a state in which a plurality of crystalline regions 114 are randomly distributed to be spaced apart from each other in an amorphous region 112; or as shown in (c) of FIG. 3, a size of the crystalline region 114 in the anode active material layer 115 may increase with an increase in the current density.

As described above, the anode active material layer 115 may have the plurality of crystalline regions 114 distributed to be spaced apart from each other in the amorphous region 112. In this case, a combined proportion of the plurality of crystalline regions 114 may be higher than a proportion of the amorphous regions 112. In other words, the anode active material layer 115 may include a high proportion of the crystalline region 114, thereby showing high mass transfer properties including ionic conductivity and local current density as a whole.

In addition, as described above, when the three dimensional current collector 105 has a form in which a plurality of fibers constitute a network, the anode active material layer 115 may be conformally deposited on a surface of the plurality of fibers as shown in the section of FIG. 5. In other words, the anode active material layer 115 may be deposited along a surface profile of the network constituted by the plurality of fibers to a thin thickness. For example, a thickness of the anode active material layer 115 may be thinner than a diameter of a section of the plurality of fibers, and a thin thickness of the anode active material layer 115 may be controlled by a method of adjusting a density and time of current applied to the three dimensional current collector 105.

Accordingly, the anode active material layer 115 deposited on the surface of the plurality of fibers may have a high specific surface area. In other words, the anode electrode may be manufactured in a porous structure having a high specific surface area. Accordingly, even if the anode active material layer 115 includes a high proportion of the crystalline region 114, nucleation sites for dendrite growth may be dispersed during charging and discharging of a secondary battery, thereby suppressing the dendrite growth. In result, due to a high specific surface area of the anode electrode, the dendrite growth may be minimized on a surface of the anode electrode (the anode active material layer 115) during charging and discharging, and the anode active material layer 115 may also include a high proportion of the crystalline region 114 to lower a mass transfer energy barrier between ions (e.g., lithium ions) and electrons of the base metal, thereby enhancing the charge/discharge efficiency of a secondary battery.

In addition, as described above, the anode active material layer 115 including the base metal may be formed on the three dimensional current collector 105 by a simple process of immersing the three dimensional current collector 105 in the electrolytic solution containing the metal salt having the base metal and applying current to the three dimensional current collector 105. A degree of crystallinity of the anode active material layer 115 may be easily controlled by a simple process of controlling the current density applied to the three dimensional current collector 105, and a thickness of the anode active material layer 115 may be controlled by a simple process of controlling the time for applying current to the three dimensional current collector 105. Accordingly, the method for manufacturing an anode electrode with less manufacturing cost and time may be provided.

In addition, the anode active material layer 115 may be manufactured with various elements by a simple method of adjusting a type of the metal salt according to a type of the base metal.

The anode electrode manufactured by the method described above with reference to FIGS. 1 to 5 may be used as an electrode of a secondary battery together with a solid electrolyte. Hereinafter, a secondary battery according to an embodiment of the present application will be described with reference to FIG. 6.

FIG. 6 is a view for explaining a secondary battery according to an embodiment of the present application.

Referring to FIG. 6, the secondary battery according to an embodiment of the present application may include an anode electrode 210, a solid electrolyte 220 and a cathode electrode 230.

The anode electrode 210 may include the anode active material layer 110 in which the base metal included in the metal salt is deposited on the current collector 100 as described with reference to FIGS. 1 to 3.

Alternatively, the anode electrode 210 may include the anode active material layer 115 in which the base metal included in the metal salt is deposited on the three dimensional current collector 105 as described with reference to FIGS. 4 and 5.

For example, the cathode electrode 230 may include a lithium oxide containing at least any one of nickel, cobalt, manganese, or aluminum. Alternatively, as another example, the cathode electrode 230 may include an oxide of lithium, phosphorus, and iron.

The solid electrolyte 220 may be a compound in which a cation and an anion are bound.

Specifically, the cation may include at least any one of thiophenium represented by <Formula 1>, thiazolium represented by <Formula 2>, phospholanium represented by <Formula 3>, or oxathiolanium represented by <Formula 4> or <Formula 5>, or thiazolidinium represented by <Formula 6>. In <Formula 1> to <Formula 6>, R1 may be an alkyl group.

<Formula 1>

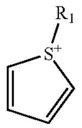

<Formula 2>

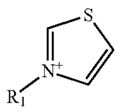

<Formula 3>

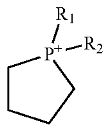

<Formula 4>

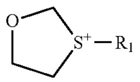

<Formula 5>

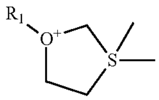

<Formula 6>

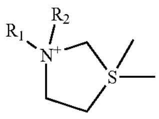

Specifically, the anion may include fluorohydrogenate represented by <Formula 7>.

<Formula 7>

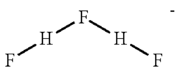

Alternatively, the anion may include cyano(nitroso) methanide or tetrazolidine.

According to another embodiment, the solid electrolyte 220 may be an oxide, sulfide, or polymer-based material, as described above.

Hereinafter, an anode electrode manufactured according to a specific experimental example based on the first embodiment of the present application, and results of evaluating properties will be described accordingly.

Preparing of Anode According to Experimental Example 1-1

LiFHF and LiFSI were prepared as metal salts, and DME and TTE were prepared as solvents.

An electrolytic solution was fabricated by adjusting a molar ratio of the metal salt, DME, and TTE to 1:1:3.

A copper substrate was prepared as a current collector and immersed in an electrolytic solution, after which a current having a current density value of 0.1 $mAcm^{-2}$, 0.5 $mAcm^{-2}$, and 1 $mAcm^{-2}$ was applied to deposit an anode active material layer formed of lithium according to Experimental Example 1-1 on the copper substrate.

Preparing of Anode According to Experimental Example 1-2

An anode was manufactured by the same method as in Experimental Example 1-1, except for using $Si(FHF)_x(x>0)$ as a metal salt and using DME as a solvent, and then a current having a current density value of 0.1 $mAcm^{-2}$ and 1 $mAcm^{-2}$ was applied to deposit an anode active material layer formed of silicon according to Experimental Example 1-2 on the copper substrate.

Preparing of Anode According to Experimental Example 1-3

An anode was manufactured by the same method as in Experimental Example 1-1, except for using $K(FHF)_x(x>0)$ as a metal salt and using DME as a solvent, and then a current having a current density value of 0.1 $mAcm^{-2}$ and 1 $mAcm^{-2}$ was applied to deposit an anode active material layer formed of potassium according to Experimental Example 1-3 on the copper substrate.

Preparing of Anode According to Experimental Example 1-4

An anode was manufactured by the same method as in Experimental Example 1-1, except for using $Na(FHF)_x(x>0)$ as a metal salt and using EC and DMC (1:1 w/w) as a solvent, and then a current having a current density value of 0.1 $mAcm^{-2}$ and 1 $mAcm^{-2}$ was applied to deposit an anode active material layer formed of sodium according to Experimental Example 1-4 on the copper substrate.

Preparing of Anode According to Experimental Example 1-5

An anode was manufactured by the same method as in Experimental Example 1-1, except for using $Mg(FHF)_x$ (x>0) as a metal salt and using THF with $AlCl_3$ 0.01 mM dissolved therein as a solvent, and then a current having a current density value of 0.1 $mAcm^{-2}$ and 1 $mAcm^{-2}$ was applied to deposit an anode active material layer formed of magnesium according to Experimental Example 1-5 on the copper substrate.

Preparing of Anode According to Experimental Example 1-6

An anode was manufactured by the same method as in Experimental Example 1-1, except for using $Al(FHF)_x(x>0)$ as a metal salt and using THF with triethylamine hydrochloride 1M dissolved therein as a solvent, and then a current having a current density value of 0.1 $mAcm^{-2}$ and 1 $mAcm^{-2}$ was applied to deposit an anode active material layer formed of aluminum according to Experimental Example 1-6 on the copper substrate.

Preparing of Anode According to Experimental Example 1-7

An anode was manufactured by the same method as in Experimental Example 1-1, except for using $Zn(FHF)_x(x>0)$ as a metal salt and using DME as a solvent, and then a current having a current density value of 0.1 $mAcm^{-2}$ and 1

$mAcm^{-2}$ was applied to deposit an anode active material layer formed of zinc according to Experimental Example 1-7 on the copper substrate.

Preparing of Anode According to Experimental Example 1-8

An anode was manufactured by the same method as in Experimental Example 1-1, except for using $Fe(FHF)_x(x>0)$ as a metal salt and using PC as a solvent, and then a current having a current density value of 0.1 $mAcm^{-2}$ and 1 $mAcm^{-2}$ was applied to deposit an anode active material layer formed of iron according to Experimental Example 1-8 on the copper substrate.

The anode according to Experimental Examples 1-1 to 1-8 may be summarized as shown in <Table 1> below.

TABLE 1

| Classification | Anode active material layer | Current density ($mAcm^{-2}$) |
|---|---|---|
| Experimental Example 1-1 | Lithium | 0.1 |
| | | 0.5 |
| | | 1 |
| Experimental Example 1-2 | Silicon | 0.1 |
| | | 1 |
| Experimental Example 1-3 | Potassium | 0.1 |
| | | 1 |
| Experimental Example 1-4 | Sodium | 0.1 |
| | | 1 |
| Experimental Example 1-5 | Magnesium | 0.1 |
| | | 1 |
| Experimental Example 1-6 | Aluminum | 0.1 |
| | | 1 |
| Experimental Example 1-7 | Zinc | 0.1 |
| | | 1 |
| Experimental Example 1-8 | Iron | 0.1 |
| | | 1 |

FIG. 7 is a view showing TEM pictures and FFT patterns of an anode electrode according to Experimental Example 1-1 of the present application.

Referring to FIG. 7, TEM pictures were taken of an anode electrode manufactured according to Experimental Example 1 as described above, and FFT patterns were shown (upper right side). Specifically, (a) to (c) of FIG. 7 show TEM pictures and FFT patterns of an anode electrode manufactured by applying a current density of 0.1 $mAcm^{-2}$, 0.5 $mAcm^{-2}$, and 1 $mAcm^{-2}$ in Experimental Example 1-1, respectively.

As can be understood from (a) of FIG. 7, when a current density applied to the current collector is relatively low as 0.1 $mAcm^{-2}$, it can be confirmed that lithium elements are formed in an amorphous structure. As can be understood from the FFT patterns, a diffraction spot having a body centered cubic (BCC) crystal structure packed with lithium was not observed.

As can be understood from (b) of FIG. 7, when a current density applied to the current collector is increased to 0.5 $mAcm^{-2}$, it can be confirmed that a partially crystalline region is formed. As can be understood from the FFT patterns, a diffraction spot was partially observed.

As can be understood from (c) of FIG. 7, when a current density applied to the current collector is increased to 1 $mAcm^{-2}$, it can be confirmed that a size of a crystalline region is relatively increased, and a crystal plane was observed from a crystalline region of lithium 110.

Accordingly, it can be confirmed that a degree of crystallinity of an anode active material layer may be easily controlled by a simple method of controlling the current density applied to the current collector.

FIG. 8 is a graph for explaining charge/discharge properties of a second battery including an anode electrode manufactured by applying a current density of 0.1 $mAcm^{-2}$ according to Experimental Example 1-1 of the present application, and FIG. 9 is a graph for explaining charge/discharge properties of a second battery including an anode electrode manufactured by applying a current density of 1 $mAcm^{-2}$ according to Experimental Example 1-1 of the present application.

Referring to FIGS. 8 and 9, a cell was manufactured by disposing the anode electrodes manufactured by applying a current density of 0.1 $mAcm^{-2}$ and 1 $mAcm^{-2}$ as described above in Experimental Example 1-1 on both sides, and the charge/discharge properties were evaluated and coulombic efficiency was measured at a current density of 1 $mAcm^{-2}$ and a capacity of 2 $mAhcm^{-2}$.

As can be understood from FIGS. 8 and 9, it can be confirmed that a cell including the anode electrode according to Experimental Examples 1-1 is stably driven for a long time. In other words, it can be seen that an anode electrode may be manufactured by a simple method of immersing a current collector in an electrolytic solution containing a metal salt having a base metal and applying current to the current collector and even in this case, the cell may be stably driven.

FIG. 10 is a view showing TEM pictures and FFT patterns of an anode electrode according to Experimental Example 1-2 of the present application.

Referring to FIG. 10, TEM pictures were taken of an anode electrode manufactured according to Experimental Example 1-2 as described above, and FFT patterns were shown (upper right side). Specifically, (a) and (b) of FIG. 10 show TEM pictures and FFT patterns of an anode electrode manufactured by applying a current density of 0.1 $mAcm^{-2}$ and 1 $mAcm^{-2}$ in Experimental Example 1-2, respectively.

As can be understood from (a) of FIG. 7, when a current density applied to the current collector is relatively low as 0.1 $mAcm^{-2}$, it can be confirmed that silicon elements are formed in an amorphous structure. As shown in (b) of FIG. 10, when a current density applied to the current collector is increased to 1 $mAcm^{-2}$, it could be confirmed that a partially crystalline region is formed, and a diffraction spot was also observed even in an FFT pattern.

FIG. 11 is a graph for explaining charge/discharge properties of a second battery including an anode electrode manufactured by applying a current density of 0.1 $mAcm^{-2}$ according to Experimental Example 1-2 of the present application.

Referring to FIG. 11, a cell was manufactured by disposing the anode electrodes manufactured by applying a current density of 0.1 $mAcm^{-2}$ as described above in Experimental Example 1-2 on both sides, and the charge/discharge properties were evaluated and coulombic efficiency was measured at a current density of 1 $mAcm^{-2}$ and a capacity of 2 $mAhcm^{-2}$.

As can be understood from FIG. 11, it can be confirmed that a cell including the anode electrode according to Experimental Examples 1-2 is stably driven for a long time. In other words, not only when the base metal is lithium according to Experimental Example 1-1, but also when the base metal is silicon according to Experimental Example 1-2, it can be seen that an anode electrode may be manufactured by a simple method of immersing a current collector in an electrolytic solution containing silicon and applying current to the current collector and even in this case, the cell may be stably driven.

FIG. 12 is a view showing TEM pictures and FFT patterns of an anode electrode according to Experimental Example 1-3 of the present application, FIG. 13 is a view showing TEM pictures and FFT patterns of an anode electrode according to Experimental Example 1-4 of the present application, FIG. 14 is a view showing TEM pictures and FFT patterns of an anode electrode according to Experimental Example 1-5 of the present application, FIG. 15 is a view showing TEM pictures and FFT patterns of an anode electrode according to Experimental Example 1-6 of the present application, FIG. 16 is a view showing TEM pictures and FFT patterns of an anode electrode according to Experimental Example 1-7 of the present application, and FIG. 17 is a view showing TEM pictures and FFT patterns of an anode electrode according to Experimental Example 1-8 of the present application.

Referring to FIGS. 12 to 17, TEM pictures were taken of an anode electrode manufactured according to Experimental Examples 1-3 to 1-8 as described above, and FFT patterns were shown (upper right side). Specifically, (a) of FIGS. 12 to 14 show TEM pictures and FFT patterns of an anode electrode manufactured by applying a current density of 0.1 $mAcm^{-2}$ in Experimental Examples 1-3 to 1-8, and (b) of FIGS. 12 to 17 show TEM pictures and FFT patterns of an anode electrode manufactured by applying a current density of 1 $mAcm^{-2}$ in Experimental Examples 1-3 to 1-8.

As can be understood from FIGS. 12 to 17, when a current density applied to the current collector is relatively low as 0.1 $mAcm^{-2}$, it can be confirmed that potassium, sodium, magnesium, aluminum, zinc, and iron elements are formed in an amorphous structure, and when a current density applied to the current collector is increased to 1 $mAcm^{-2}$, it could be confirmed that a partially crystalline region is formed, and a diffraction spot was also observed even in an FFT pattern.

Not only when the base metal is lithium and silicon according to Experimental Examples 1-1 and 1-2, but also when various elements are used as an anode active material, it can be seen that a degree of crystallinity of an anode active material layer may be controlled by a simple method of controlling a current density.

FIG. 18 is a graph for comparing and explaining charge/discharge properties of a second battery including an anode electrode according to Experimental Examples 1-1 and 1-2 of the present application.

Referring to FIG. 18, a cell was manufactured by using ThF electrolyte along with an anode electrode manufactured by applying a current density of 0.1 $mAcm^{-2}$ and 1 $mAcm^{-2}$ in Experimental Example 1-1 and an anode electrode manufactured by applying a current density of 0.1 $mAcm^{-2}$ in Experimental Example 1-2, and charge/discharge was performed 120 times under 1C condition.

As can be understood from FIG. 18, it can be confirmed that a secondary battery including an anode electrode according to Experimental Examples 1-1 and 1-2 is stably driven with high retention properties and high charge/discharge capacity.

In addition, it can be seen that a cell having an anode active material layer of an amorphous region with a current density of 0.1 $mAcm^{-2}$ applied in Experimental Example 1-1 has a high initial capacity compared to a cell having an anode active material layer of a crystalline region increased in size with a current density of 1 $mAcm^{-2}$ applied.

Hereinafter, an anode electrode manufactured according to a specific experimental example based on the second embodiment of the present application, and results of evaluating properties will be described accordingly.

Manufacturing of Copper Nanowire According to Experimental Example

Ethylenediamine and glucose were mixed and reacted. After that, hydrazine was added as a reducing agent. A copper substrate was washed, immersed and reacted at 60° C. for 15 minutes to grow a copper nanowire on the copper substrate.

Manufacturing of Copper Nanotube According to Experimental Example

Ammonium hydroxide and KOH were mixed and reacted. After that, hydrazine was added as a reducing agent, and sucrose was further added.

A copper substrate was washed, immersed and reacted at 90° C. for three hours to grow a copper nanotube on the copper substrate.

Manufacturing of Anode According to Experimental Example 1-9

LiFHF and LiFSI were prepared as metal salts, DME and TTE were prepared as solvents, and a copper substrate having a copper nanowire according to the above-described experimental example was prepared as a three dimensional current collector.

An electrolytic solution was fabricated by adjusting a molar ratio of the metal salt, DME, and TTE to 1:1:3.

A copper substrate having a copper nanowire was immersed in an electrolytic solution, after which a current having a current density value of 1 $mAcm^{-2}$ was applied to deposit an anode active material layer formed of lithium according to Experimental Example 1-9 on the copper nanowire.

Manufacturing of Anode According to Experimental Example 1-10

An anode electrode according to Experimental Example 1-10 was manufactured by the same method as in Experimental Example 1-9, except for using a copper substrate having a copper nanotube according to the above-described experimental example as a three dimensional current collector.

Manufacturing of Anode According to Experimental Example 1-11

An anode was manufactured by the same method as in Experimental Example 1-9, except that a copper substrate having a two dimensional structure was prepared as a current collector and immersed in an electrolytic solution, after which a current having a current density value of 0.1 $mAcm^{-2}$, 0.5 $mAcm^{-2}$, and 1 $mAcm^{-2}$ was applied to deposit an anode active material layer formed of lithium according to Experimental Example 1-11 on the copper substrate.

FIG. 19 is a view showing SEM pictures and TEM pictures of an anode electrode according to Experimental Example 1-9 of the present application, FIG. 20 is a view showing SEM pictures and TEM pictures of an anode electrode according to Experimental Example 1-10 of the present application, and FIG. 21 is a view showing TEM pictures and FFT patterns of an anode electrode according to Experimental Example 1-11 of the present application.

Referring to FIGS. 19 to 21, SEM pictures and TEM pictures were taken of an anode electrode manufactured according to Experimental Examples 1-9 and 1-10 as described above, TEM pictures were taken of an anode electrode manufactured according to Experimental Example 1-11, and FFT patterns were shown (upper right side). Specifically, (a) to (c) of FIG. 21 show TEM pictures and FFT patterns of an anode electrode manufactured by applying a current density of 0.1 $mAcm^{-2}$, 0.5 $mAcm^{-2}$, and 1 $mAcm^{-2}$ in Experimental Example 1-11, respectively.

As can be understood from FIGS. 19 and 20, when a current density applied to a three dimensional current collector is 1 $mAcm^{-2}$, it can be confirmed that a lithium anode active material layer has an amorphous structure.

In contrast, as can be understood from (a) of FIG. 21, when a current density applied to the current collector having a two dimensional structure is relatively low as 0.1 $mAcm^{-2}$, it can be confirmed that lithium elements are formed in an amorphous structure. As can be understood from the FFT patterns, a diffraction spot having a body centered cubic (BBC) crystal structure packed with lithium was not observed.

In addition, as can be understood from (b) of FIG. 21, when a current density applied to the current collector is increased to 0.5 $mAcm^{-2}$, it can be confirmed that a partially crystalline region is formed. As can be understood from the FFT patterns, a diffraction spot was partially observed. As can be understood from (c) of FIG. 21, when a current density applied to the current collector is increased to 1 $mAcm^{-2}$, it can be confirmed that a size of a crystalline region is relatively increased, and a crystal plane was observed from a crystalline region of lithium 110.

Accordingly, when the anode active material layer is deposited by electrolytic deposition by using a three dimensional current collector, it can be confirmed that an amorphous state is maintained even at a relatively high current density, compared to when using a two dimensional current collector. In contrast, in case of using a two dimensional current collector, a crystalline region started to be generated when a current density is 0.5 $mAcm^{-2}$ or more, and a crystalline region started to grow rapidly when a current density is 1 $mACm^{-2}$. In other words, when a three dimensional current collector is used, a process window capable of controlling a ratio of an amorphous region and a crystalline region in an anode active material layer is relatively wide, and thus it can be seen that a degree of crystallinity of the anode active material layer may be easily controlled.

In addition, a degree of crystallinity of an anode active material layer may be easily controlled by a simple method of controlling the current density applied to the current collector.

FIG. 22 is a graph for explaining charge/discharge properties of a second battery including an anode electrode manufactured according to Experimental Example 1-9 of the present application, and FIG. 23 is a graph for explaining charge/discharge properties of a second battery including an anode electrode manufactured according to Experimental Example 1-10 of the present application.

Referring to FIGS. 22 and 23, a cell was manufactured by disposing the anode electrodes according to Experimental Examples 1-9 and 1-10 described above on both sides, and the charge/discharge properties were evaluated and coulombic efficiency was measured at a current density of 1 $mAcm^{-2}$ and a capacity of 2 $mAhcm^{-2}$.

As can be understood from FIGS. 22 and 23, it can be confirmed that a cell including the anode electrodes according to Experimental Examples 1-9 and 1-10 is stably driven for a long time. In other words, it can be seen that an anode electrode may be manufactured by a simple method of immersing a three dimensional current collector in an electrolytic solution containing a metal salt having a base metal and applying current to the three dimensional current collector and even in this case, the cell may be stably driven.

FIG. 24 is a graph for explaining charge/discharge properties of a second battery including an anode manufactured according to Experimental Examples 1-9 and 1-10 of the present application, and FIG. 25 is a graph for explaining charge/discharge properties of a second battery including an anode manufactured according to Experimental Example 1-11 of the present application.

Referring to FIG. 24, a cell was manufactured by using a ThF electrolyte along with anode electrodes manufactured according to Experimental Examples 1-9 and 1-10, and charge/discharge was performed 100 times under 1C condition. Referring to FIG. 25, a cell was manufactured by using a ThF electrolyte along with an anode electrode manufactured by applying a current density of 0.1 $mAcm^{-2}$ and 1 $mAcm^{-2}$ in Experimental Example 1-1, and charge/discharge was performed 120 times under 1C condition.

As can be understood from FIGS. 24 and 25, it can be confirmed that a secondary battery including the anode electrodes according to Experimental Examples 1-9 and 1-11 is stably driven with high retention properties. In particular, when using a three dimensional current collector according to Experimental Examples 1-9 and 1-11, it can be confirmed that the secondary battery has a higher charge/discharge capacity of about 3100 $mAhg^{-1}$ compared to when using a current collector having a two dimensional structure according to Experimental Example 1-11.

Hereinafter, according to specific experimental examples of the present application, a solid electrolyte including a compound in which various cations and anions are bound, and results of evaluating their properties will be described.

Preparing of Compound According to Experimental Example 2-1

Acetonitrile was provided into a conical flask, after which dichloromethane was added and stirred at room temperature for 10 minutes to prepare a solution containing an alkyl group. In this case, the preparation of the solution containing the alkyl group was performed in a glove box without moisture.

Thiophene was dripped into the solution containing the alkyl group while being stirred, after which a uniformly mixed solution was slowly stirred at room temperature for four days so as to prepare thiophenium salt having a methyl group which is a cation source.

A washing process was performed by providing the thiophenium salt and a solvent of ethyl acetate and diethyl ether into a rotary concentrator.

1M hydrofluoric acid and extra water were added into a conical flask and stirred for 10 minutes to prepare a fluorohydrogenate precursor which is an anion source.

Thiophenium salt was added into the fluorohydrogenate precursor to prepare a mixed solution. The mixed solution was left alone at a temperature of −70° C. for 24 hours, so as to prepare a compound in which thiazolium salt and the fluorohydrogenate were bound as an intermediate product of the solid electrolyte.

The compound was provided into a glove box under a nitrogen atmosphere and left alone at room temperature for two to three hours, so that volatile gas was removed. After that, a drying process was performed by providing the compound into the rotary concentrator, so as to prepare a compound according to Experimental Example 2-1, in which a thiophenium cation having a methyl group (R1) and a fluorohydrogenate anion are bound.

Preparing of Compound According to Experimental Example 2-2

A compound was prepared by the same method as described above in Experimental Example 2-1. However, ethyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-2, in which a thiophenium cation having an ethyl group (R1) and a fluorohydrogenate anion are bound.

Preparing of Compound According to Experimental Example 2-3

A compound was prepared by the same method as described above in Experimental Example 2-1. However, propyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-3, in which a thiophenium cation having a propyl group (R1) and a fluorohydrogenate anion are bound.

Preparing of Compound According to Experimental Example 2-4

A compound was prepared by the same method as described above in Experimental Example 2-1. However, butyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-4, in which a thiophenium cation having a butyl group (R1) and a fluorohydrogenate anion are bound.

Preparing of Compound According to Experimental Example 3-1

A compound was prepared by the same method as described above in Experimental Example 2-1, but thiazoline was added into a solution containing an alkyl group so as to prepare thiazolium salt as a cation source.

After that, thiazolium salt and a fluorohydrogenate precursor were reacted by the same method as described above in Experimental Example 2-1, so as to prepare the compound according to Experimental Example 3-1, in which a thiazolium cation having a methyl group (R1) and a fluorohydrogenate anion are bound.

Preparing of Compound According to Experimental Example 3-2

A compound was prepared by the same method as described above in Experimental Example 2-2, but thiazoline was added into a solution containing an alkyl group so as to prepare thiazolium salt as a cation source.

After that, thiazolium salt and a fluorohydrogenate precursor were reacted by the same method as described above in Experimental Example 2-2, so as to prepare the compound according to Experimental Example 3-2, in which a thiazolium cation having an ethyl group (R1) and a fluorohydrogenate anion are bound.

Preparing of Compound According to Experimental Example 3-3

A compound was prepared by the same method as described above in Experimental Example 2-3, but thiazoline was added into a solution containing an alkyl group so as to prepare thiazolium salt as a cation source.

After that, thiazolium salt and a fluorohydrogenate precursor were reacted by the same method as described above in Experimental Example 2-3, so as to prepare the compound according to Experimental Example 3-3, in which a thiazolium cation having a propyl group (R1) and a fluorohydrogenate anion are bound.

Preparing of Compound According to Experimental Example 3-4

A compound was prepared by the same method as described above in Experimental Example 2-4, but thiazoline was added into a solution containing an alkyl group so as to prepare thiazolium salt as a cation source.

After that, thiazolium salt and a fluorohydrogenate precursor were reacted by the same method as described above in Experimental Example 2-4, so as to prepare the compound according to Experimental Example 3-4, in which a thiazolium cation having a butyl group (R1) and a fluorohydrogenate anion are bound.

Preparing of Compound According to Experimental Example 4-1

Phospholanium was provided as a cation, and fluorohydrogenate prepared according to Experimental Example 2-1 as described above was used as an anion, so as to prepare the compound according to Experimental Example 4-1, in which a phospholanium cation having a methyl group (R1) and an ethyl group (R2) and a fluorohydrogenate anion are bound.

Preparing of Compound According to Experimental Example 4-2

A compound was prepared by the same method as described above in Experimental Example 4-1, so as to prepare the compound according to Experimental Example 4-2, in which a phospholanium cation having a methyl group (R1) and a propyl group (R2) and a fluorohydrogenate anion are bound.

Preparing of Compound According to Experimental Example 4-3

A compound was prepared by the same method as described above in Experimental Example 4-1, so as to prepare the compound according to Experimental Example 4-3, in which a phospholanium cation having a methyl group (R1) and a butyl group (R2) and a fluorohydrogenate anion are bound.

Preparing of Compound According to Experimental Example 4-4

A compound was prepared by the same method as described above in Experimental Example 4-1, so as to prepare the compound according to Experimental Example 4-4, in which a phospholanium cation having an ethyl group (R1) and a butyl group (R2) and a fluorohydrogenate anion are bound.

Preparing of Compound According to Experimental Example 4-5

A compound was prepared by the same method as described above in Experimental Example 4-1, so as to prepare the compound according to Experimental Example 4-5, in which a phospholanium cation having a methyl group (R1) and a methyl group (R2) and a fluorohydrogenate anion are bound.

Preparing of Compound According to Experimental Example 5-1

Oxathiolanium represented by <Formula 8> was provided as a cation, and fluorohydrogenate prepared according to Experimental Example 2-1 as described above was used as an anion, so as to prepare the compound according to Experimental Example 5-1, in which an oxathiolanium cation having a methyl group (R1) and a fluorohydrogenate anion are bound.

Preparing of Compound According to Experimental Example 5-2

A compound was prepared by the same method as described above in Experimental Example 5-1, so as to prepare the compound according to Experimental Example 5-2, in which an oxathiolanium cation having an ethyl group (R1) and a fluorohydrogenate anion are bound.

Preparing of Compound According to Experimental Example 5-3

A compound was prepared by the same method as described above in Experimental Example 5-1, so as to prepare the compound according to Experimental Example 5-3, in which an oxathiolanium cation having a propyl group (R1) and a fluorohydrogenate anion are bound.

Preparing of Compound According to Experimental Example 5-4

A compound was prepared by the same method as described above in Experimental Example 5-1, so as to prepare the compound according to Experimental Example 5-4, in which an oxathiolanium cation having a butyl group (R1) and a fluorohydrogenate anion are bound.

Preparing of Compound According to Experimental Example 6-1

Thiazolidinium was provided as a cation, and fluorohydrogenate prepared according to Experimental Example 2-1 as described above was used as an anion, so as to prepare the compound according to Experimental Example 6-1, in which a thiazolidinium cation having a methyl group (R1) and an ethyl group (R2) bound to a nitrogen element, and two methyl groups bound to a sulfur element, and a fluorohydrogenate anion are bound.

Preparing of Compound According to Experimental Example 6-2

A compound was prepared by the same method as described above in Experimental Example 6-1, so as to prepare the compound according to Experimental Example 6-2, in which a thiazolidinium cation having a methyl group (R1) and a propyl group (R2) bound to a nitrogen element, and two methyl groups bound to a sulfur element, and a fluorohydrogenate anion are bound.

Preparing of Compound According to Experimental Example 6-3

A compound was prepared by the same method as described above in Experimental Example 6-1, so as to prepare the compound according to Experimental Example 6-3, in which a thiazolidinium cation having a methyl group (R1) and a butyl group (R2) bound to a nitrogen element, and two methyl groups bound to a sulfur element, and a fluorohydrogenate anion are bound.

Preparing of Compound According to Experimental Example 6-4

A compound was prepared by the same method as described above in Experimental Example 6-1, so as to prepare the compound according to Experimental Example 8-4, in which a thiazolidinium cation having an ethyl group (R1) and a butyl group (R2) bound to a nitrogen element, and two methyl groups bound to a sulfur element, and a fluorohydrogenate anion are bound.

The ion conductivity of the compounds according to Experimental Examples 2-1 to 6-4 was measured at room temperature, and the ion molecular weight of cations and the state information of the compounds according to Experimental Examples 2-1 to 6-4 are summarized as shown in <Table 3>.

TABLE 3

| Classification | Cation | Alkyl group | Ion molecular weight (g/mol) | State | Ion conductivity ($mS/cm^2$) |
|---|---|---|---|---|---|
| Experimental Example 2-1 | Thiophenium | Methyl group | 99.15 | Crystalline solid | 126 |
| Experimental Example 2-2 | | Ethyl group | 113.14 | Crystalline solid | 103 |
| Experimental Example 2-3 | | Propyl group | 127.15 | Crystalline solid | 68 |
| Experimental Example 2-4 | | Butyl group | 142.16 | Crystalline solid | 46 |
| Experimental Example 3-1 | Thiazolium | Methyl group | 101.13 | Crystalline solid | 45 |
| Experimental Example 3-2 | | Ethyl group | 114.14 | Crystalline solid | 74 |
| Experimental Example 3-3 | | Propyl group | 126.15 | Crystalline solid | 18.9 |
| Experimental Example 3-4 | | Butyl group | 143.13 | Crystalline solid | 6.8 |
| Experimental Example 4-1 | Phospholanium | Methyl group/ Ethyl group | 130.97 | Crystalline solid | 2 |
| Experimental Example 4-2 | | Methyl group/ Propyl group | 143.1 | Crystalline solid | 35 |
| Experimental Example 4-3 | | Methyl group/ Butyl group | 159.9 | Crystalline solid | 16 |
| Experimental Example 4-4 | | Ethyl group/ Butyl group | 174 | Crystalline solid | 45 |
| Experimental Example 4-5 | | Methyl group/ Methyl group | 117 | Crystalline solid | 24 |
| Experimental Example 5-1 | Oxathiolanium | Methyl group | 106.06 | Crystalline solid | 12 |
| Experimental Example 5-2 | | Ethyl group | 120.07 | Crystalline solid | 17.5 |
| Experimental Example 5-3 | | Propyl group | 132.06 | Crystalline solid | 26.5 |
| Experimental Example 5-4 | | Butyl group | 149.06 | Crystalline solid | 21.1 |
| Experimental Example 6-1 | Thiazolidinium | Methyl group/ Ethyl group Methyl group/ Methyl group | 99.15 | Crystalline solid | 60 |

TABLE 3-continued

| Classification | Cation | Alkyl group | Ion molecular weight (g/mol) | State | Ion conductivity (mS/cm$^2$) |
|---|---|---|---|---|---|
| Experimental Example 6-2 | | Methyl group/ Propyl group Methyl group/ Methyl group | 113.14 | Crystalline solid | 19.6 |
| Experimental Example 6-3 | | Methyl group/ Butyl group Methyl group/ Methyl group | 127.15 | Crystalline solid | 28.7 |
| Experimental Example 6-4 | | Ethyl group/ Butyl group Methyl group/ Methyl group | 142.16 | Crystalline solid | 5.8 |

As can be understood from <Table 3>, it can be confirmed that compounds have a high ion conductivity, if thiophenium is included as a cation (Experimental Examples 2-1 to 2-4), if thiazolium having a methyl group, an ethyl group, or a propyl group is included (Experimental Examples 3-1 to 3-3), if phospholanium having a methyl group/propyl group, a methyl group/butyl group, an ethyl group/butyl group, or a methyl group/methyl group is included (Experimental Examples 4-2 to 4-5), if oxathiolanium having an ethyl group, a propyl group, or a butyl group is included (Experimental Examples 5-2 to 5-4), and if a thiazolidinium having a methyl group/ethyl group, a methyl group/propyl group, and a methyl group/butyl group is included (Experimental Examples 6-1 to 6-3).

Thiophenium having a methyl group identified as having the highest ion conductivity in <Table 3> was fixed as a cation and a type of anion was varied to prepare a compound for a solid electrolyte according to Experimental Examples 7-1 to 7-2.

Preparing of Compound According to Experimental Example 7-1

Cyano(nitroso)methanide was provided as an anion so as to prepare a compound according to Experimental Example 7-1 in which a thiophenium cation having a methyl group according to Experimental Example 2-1 as described above and a cyano(nitroso)methanide anion are bound.

Preparing of Compound According to Experimental Example 7-2

Tetrazolidine was provided as an anion so as to prepare a compound according to Experimental Example 7-2 in which a thiophenium cation having a methyl group according to Experimental Example 2-1 as described above and a tetrazolidine anion are bound.

The ion conductivity of the compounds according to Experimental Examples 7-1 to 7-2 was measured at room temperature, and the molecular weight of anions, the state information of the compounds according to Experimental Examples 7-1 to 7-2 are summarized as shown in <Table 4>.

TABLE 4

| Classification | Anion | Ion Molecular weight (g/mol) | State | Ion conductivity (mS/cm$^2$) |
|---|---|---|---|---|
| Experimental Example 1-1 | Fluorohydrogenate | 63 | Crystalline solid | 126 |
| Experimental Example 7-1 | Cyano(nitro)methanide | 69 | Crystalline solid | 48.6 |

TABLE 4-continued

| Classification | Anion | Ion Molecular weight (g/mol) | State | Ion conductivity (mS/cm$^2$) |
|---|---|---|---|---|
| Experimental Example 7-2 | Tetrazolidine | 72 | Crystalline solid | 69.4 |

As can be understood from <Table 4>, it can be confirmed that compounds have a high ion conductivity, if fluorohydrogenate is included as an anion (Experimental Example 2-1), if cyano(nitroso)methanide is included (Experimental Example 7-1), and if tetrazolidine is included (Experimental Examples 7-2).

Preparing of Solid Electrolyte According to Experimental Example 8-1

A 1M hydrofluoric acid aqueous solution and lithium chloride (LiCl) were added into a container and left alone at a temperature of −70° C. for 24 hours, so as to prepare lithium fluorohydrogenate.

A compound having a methyl group according to Experimental Example 2-1 described above was heated to 60° C. and lithium fluorohydrogenate was added in an amount of 1 mol % at the same time and reacted for two hours, so as to prepare a solid electrolyte according to Experimental Example 8-1.

Preparing of Solid Electrolyte According to Experimental Example 8-2

A solid electrolyte was prepared by the same method as described above in Experimental Example 8-1. However, lithium fluorohydrogenate was added in an amount of 5 mol % instead of 1 mol %, so as to prepare a solid electrolyte according to Experimental Example 8-2.

Preparing of Solid Electrolyte According to Experimental Example 8-3

A solid electrolyte was prepared by the same method as described above in Experimental Example 8-1. However, lithium fluorohydrogenate was added in an amount of 10 mol % instead of 1 mol %, so as to prepare a solid electrolyte according to Experimental Example 8-3.

FIG. 26 is a differential scanning calorimetry (DSC) graph showing a compound according to Experimental Example 2-1 and a solid electrolyte according to Experimental Example 8-3 of the present application.

Referring to FIG. 26, a solid-liquid or solid-solid state change depending on a temperature may be observed in the compound according to Experimental Example 2-1 and the solid electrolyte according to Experimental Example 8-3.

As shown in FIG. 26, a solid-liquid state change was observed at 90° C. in the compound of Experimental Example 2-1. In contrast, a solid-liquid state change was observed at 70° C. in the solid electrolyte of Experimental Example 8-3.

In addition, a solid-solid state change was observed twice in the compound of Experimental Example 2-1, and specifically it can be seen that the compound of Experimental Example 2-1 has a first crystal phase in a temperature range of 28 to 90° C. and a second crystal phase in a temperature range of 22 to 28° C. In contrast, a solid-solid state change was observed once in the solid electrolyte of Experimental Example 8-3, and it can be confirmed that the solid electrolyte has one crystal phase in a temperature range of 22 to 70° C.

FIG. 27 is a DSC graph showing a compound according to Experimental Examples 7-1 and 7-2 of the present application.

Referring to FIG. 27, a state change of compounds according to Experimental Examples 7-1 and 7-2 was observed depending on a temperature.

As can be understood from FIG. 27, it can be confirmed that the compounds according to Experimental Examples 7-1 and 7-2 stably maintain a solid crystal phase in a relatively wide range of temperatures. Specifically, it can be confirmed that the compound according to Experimental Example 7-1 and the compound according to Experimental Example 7-2 stably maintain a solid crystal phase −15 to 98° C. and at −59 to 129° C., respectively. In addition, the compounds according to Experimental Examples 7-1 and 7-2 have a somewhat low ion conductivity compared to the compound according to Experimental Example 2-1, but stably maintain a crystal phase in a range of temperatures wider than the range of temperatures (28 to 90° C.) in which the compound according to Experimental Example 2-1 stably maintains a first crystal phase as shown in FIG. 17. Accordingly, the compounds according to Experimental Examples 7-1 and 7-2 can be useful in military or space fields, or low-temperature environments such as a polar region.

FIG. 28 is a view for explaining a crystal structure of a solid electrolyte according to Experimental Examples 8-1 to 8-3 of the present application.

Referring to FIG. 28, the solid electrolytes according to Experimental Examples 8-1 to 8-3 may include a thiophenium cation, a fluorohydrogenate anion and lithium salt.

A unit cell of the compound in which a thiophenium cation and a fluorohydrogenate anion are bound may have an orthorhombic crystal structure, in which the thiophenium cation may be provided at a vertex of the crystal structure and at a center of a face thereof, and the fluorohydrogenate anion may be provided in a middle of an edge of the crystal structure. In this case, the solid electrolyte of Experimental Examples 8-1 to 8-3 may have the lithium salt optionally provided at interstitial sites of the crystal structure. Specifically, the lithium salt may include lithium fluorohydrogenate.

The lithium salt may be provided at the interstitial sites of the crystal structure of the compound, and thus may easily move within the crystal structure. Accordingly, an ion conductivity may increase as an addition amount of the lithium fluorohydrogenate, which is lithium salt, increases.

FIG. 29 is a graph showing an ion conductivity of a compound according to Experimental Example 2-1 and a solid electrolyte according to Experimental Examples 8-1 to 8-3 of the present application depending on a temperature.

Referring to FIG. 29, a lithium ion conductivity was measured with regard to a compound according to Experimental Example 2-1 and a solid electrolyte according to Experimental Examples 8-1 to 8-3. As described above with reference to FIG. 33, lithium fluorohydrogenate may be optionally provided at interstitial sites in the crystal structure of the compound of the solid electrolyte of Experimental Examples 8-1 to 8-3. Accordingly, it was observed that lithium fluorohydrogenate may easily move within the crystal structure, and thus, when an addition amount of lithium fluorohydrogenate is increased, an ion conductivity becomes higher.

In this case, lithium fluorohydrogenate may move to interstitial sites in the crystal structure where lithium fluorohydrogenate is not provided, and may exhibit a high ion conductivity. Thus, as the interstitial sites provided with lithium fluorohydrogenate increase, a rate of increase in ion conductivity may reach saturation. In other words, as shown in FIG. 34, it can be confirmed that the ion conductivity substantially reaches saturation, if an addition amount of the lithium fluorohydrogenate is 5 mol % or more.

FIG. 30 is a picture of a electrolyte membrane coated with a solid electrolyte according to Experimental Example 8-1 of the present application.

Referring to FIG. 30, a picture was taken of a solid electrolyte membrane in the form of a film in which a solid electrolyte according to Experimental Example 8-1 of the present application is coated on a polytetrafluoroethylene (PTFE) resin. In this case, it was confirmed that the solid electrolyte membrane maintains the softness and transparency of the resin.

Although the present application has been described in detail with reference to exemplary embodiments, the scope of the present application is not limited to a specific embodiment and should be interpreted by the attached claims. In addition, those skilled in the art should understand that many modifications and variations are possible without departing from the scope of the present application.

INDUSTRIAL APPLICABILITY

The electrode according to an embodiment of the present application may be used for a secondary battery, a super capacitor or the like.

The invention claimed is:

1. An anode electrode comprising:

a three dimensional current collector; and an anode active material layer provided on a surface of the three dimensional current collector, wherein the anode active material layer includes at least one of sodium, potassium, magnesium, aluminum, zinc, or iron, wherein the anode active material layer comprises both an amorphous region and crystalline regions, wherein a proportion of the amorphous region in the anode active material layer is greater than a proportion of the crystalline regions in the anode active material layer, wherein the crystalline regions are randomly distributed to be spaced apart from each other in the amorphous region, and wherein the anode active material layer has a thickness that is greater than or equal to 50 μm and less than or equal to 100 μm.

2. The anode electrode of claim 1, wherein the three dimensional current collector has a form in which a plurality of fibers constitute a network, and the anode active material layer is deposited on a surface of the plurality of fibers.

3. The anode electrode of claim 2, wherein the anode active material layer is provided on the surface of the plurality of fibers to provide a pore between the plurality of fibers.

4. The anode electrode of claim 1, wherein the anode active material layer includes at least one of sodium, potassium, zinc, or iron.

5. The anode electrode of claim 1, wherein the three dimensional current collector comprises a metal nanowire or a metal nanotube.

6. A secondary battery comprising:

the anode electrode according to claim 1;

a cathode electrode on the anode electrode; and a solid electrolyte between the anode electrode and the cathode electrode.

7. The secondary battery of claim 6, wherein the solid electrolyte comprises a compound in which a cation and an anion are bound, the cation comprises thiophenium, and the anion comprising fluorohydrogenate.

8. An anode electrode comprising:

a current collector; and an anode active material layer disposed on the current collector and including a base metal, wherein the anode active material layer has a plurality of crystalline regions randomly distributed to be spaced apart from each other in an amorphous region, wherein a proportion of the amorphous region in the anode active material layer is greater than a proportion of the plurality of crystalline regions in the anode active material layer, wherein the anode active material layer has a thickness that is greater than or equal to 50 μm and less than or equal to 100 μm, wherein the anode active material layer is electrolytically deposited using an electrolytic solution that includes a metal salt, and wherein the metal salt comprises a compound of the base metal, fluorine, and hydrogen.

9. A secondary battery comprising:

the anode electrode according to claim 8;

a cathode electrode on the anode electrode; and a solid electrolyte between the anode electrode and the cathode electrode.

* * * * *